US012136246B2

(12) United States Patent
Richards et al.

(10) Patent No.: US 12,136,246 B2
(45) Date of Patent: Nov. 5, 2024

(54) MULTISPECTRAL IMAGING FOR THERMAL AND ELECTRICAL DETECTION SYSTEMS AND METHODS

(71) Applicant: Teledyne FLIR Commercial Systems, Inc., Goleta, CA (US)

(72) Inventors: Austin A. Richards, Santa Barbara, CA (US); Nicholas Hogasten, Santa Barbara, CA (US); Selah Argent, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 200 days.

(21) Appl. No.: 17/962,019

(22) Filed: Oct. 7, 2022

(65) Prior Publication Data

US 2023/0040707 A1 Feb. 9, 2023

Related U.S. Application Data

(63) Continuation of application No. PCT/US2021/026486, filed on Apr. 8, 2021.

(60) Provisional application No. 63/007,728, filed on Apr. 9, 2020.

(51) Int. Cl.
*G06V 10/147* (2022.01)
*G06T 7/00* (2017.01)
(Continued)

(52) U.S. Cl.
CPC .......... *G06V 10/147* (2022.01); *G06T 7/0002* (2013.01); *G06T 7/73* (2017.01);
(Continued)

(58) Field of Classification Search
CPC .................. G06T 7/0002; G06T 2207/10036
See application file for complete search history.

(56) References Cited

U.S. PATENT DOCUMENTS 3,665,440 A 5/1972 McMenamin
4,370,557 A 1/1983 Axmark et al.
(Continued)

OTHER PUBLICATIONS

Peskov et al., "A New Supersensitive Flame Detector and it's Use for Early Forest Fire Detection," Sep. 19, 2007, CERN.
(Continued)

*Primary Examiner* — Thomas S McCormack
(74) *Attorney, Agent, or Firm* — Haynes and Boone, LLP

(57) ABSTRACT

Multispectral imaging and related techniques are provided to detect thermal and non-thermal anomalies at reduced false detection rates. A multispectral imaging system includes an infrared light imaging sensor that captures infrared image data in a first spectral band, of a scene and an ultraviolet light imaging sensor that captures ultraviolet image data in a second spectral band, of the scene. The system also includes a processor that combines the ultraviolet image data and the infrared image data to generate composite image data, determines a ratio of a first radiant intensity in the first spectral band to a second radiant intensity in the second spectral band, from the composite image data, and determines whether the ratio corresponds to a predetermined radiant intensity ratio of a known thermal or electrical anomaly. The processor can detect the thermal or electrical anomaly when the determined ratio corresponds to the predetermined radiant intensity ratio.

20 Claims, 12 Drawing Sheets

(51) Int. Cl.
  *G06T 7/73* (2017.01)
  *G08B 17/12* (2006.01)
(52) U.S. Cl.
  CPC .. *G08B 17/125* (2013.01); *G06T 2207/10036* (2013.01); *G06T 2207/10048* (2013.01); *G06T 2207/20081* (2013.01); *G06T 2207/20084* (2013.01); *G06T 2207/30168* (2013.01)

(56) References Cited

U.S. PATENT DOCUMENTS

| | | |
|---|---|---|
| 5,937,077 A | 8/1999 | Chan et al. |
| 6,518,574 B1 | 2/2003 | Castleman |
| 7,298,869 B1 | 11/2007 | Abernathy |
| 2015/0304612 A1 | 10/2015 | Richards et al. |
| 2019/0321905 A1 | 10/2019 | Wang et al. |

OTHER PUBLICATIONS

"The Monitor: How to Select a Flame Detector," Mar. 2010, General Monitors.
"General Monitors Models FL3100/FI3101," Nov. 2013, General Monitors http://www.gmsystemsgroup.com/downloads/literature/flame/FL3100_FL3101_DATA.PDF.
"How UV, IR and Imaging Detectors Work," Jul. 3, 2017, AZo Sensors https://www.azosensors.com/article.aspx?ArticleID=815.
Nguyen et al., "Automatic autonomous vision-based power line inspection; A review of current status and the potential role of deep learning," Jan. 9, 2018, pp. 107-120, vol. 99, International Journal of Electrical Power & Energy Systems Oxford, Great Britain.

MULTISPECTRAL IMAGING FOR THERMAL AND ELECTRICAL DETECTION SYSTEMS AND METHODS

CROSS-REFERENCE TO RELATED APPLICATIONS

This application is a continuation of International Patent Application No. PCT/US2021/026486 filed Apr. 8, 2021 and entitled "MULTISPECTRAL IMAGING FOR THERMAL AND ELECTRICAL DETECTION SYSTEMS AND METHODS," which claims priority to and the benefit of U.S. Provisional Patent Application No. 63/007,728 filed Apr. 9, 2020 and entitled "MULTISPECTRAL IMAGING FOR THERMAL AND ELECTRICAL DETECTION SYSTEMS AND METHODS," all of which are hereby incorporated by reference in their entirety.

TECHNICAL FIELD

The present disclosure relates generally to multispectral imaging and, more particularly, to systems and methods for multispectral imaging for use in thermal and electrical anomaly detections.

BACKGROUND

Conventional flame imaging systems have been used to detect potentially hazardous open flames to help extinguish and/or minimize the unwanted harm they may cause. There are many application examples where unwanted and potentially hazardous open flames can occur in a scene that routinely contains high-temperature infrared sources such as heavy equipment exhaust pipes, welding, and torch-cutting operations. However, these sources can mimic an open flame to an infrared camera, which can lead to a high rate of false alarms. The most common false alarm source type is the exhaust pipe on a bulldozer or excavator, which can achieve the same apparent temperature as an accidental open flame.

Thus, there is a need for imaging systems and related techniques that provide a reduction in false alarm rates for detecting various types of anomalies including thermal and electrical anomalies. Moreover, because electrical distribution systems extend over large distances, it can be difficult to provide frequent manned inspections of electrical equipment, particularly in remote locations. It would therefore be desirable to be able to provide improved electrical equipment monitoring systems.

SUMMARY

The subject technology provides for a multispectral imaging system that is an array of at least two electromagnetic radiation sensors in multiple spectral bands where a scene can emit enough radiation to be detectable at proximate distances and/or at standoff distances of tens of meters and farther. Multispectral imaging systems and related techniques are provided to improve the detection of electrical anomalies, such as corona discharges, and thermal events, such as fires with open flames, with a high degree of immunity to false alarms by processing a combination of the signals from different sensors. The addition of additional spectral bands such as the shortwave ultraviolet (SWUV) band can thus act as a "gate" in concert with an Infrared (IR) sensor to reduce the number of false alarms generated by the system.

The multispectral imaging system may be provided for monitoring electrical equipment such as high-voltage electrical equipment and/or monitoring industrial areas such as recycling centers and scrapyards according to one or more embodiments. The multispectral imaging system may include one or more imaging modules for capturing images in response to incoming light of various wavelengths.

According to an embodiment, the imaging modules may include an ultraviolet (UV) sensor module for capturing SWUV images and an IR sensor module for capturing longwave infrared (LWIR) images. The imaging modules may have a common boresight.

According to an embodiment, the multispectral imaging system may be mounted on a fixed platform or a mobile platform. The mobile platform may generally be a flight platform (e.g., a manned aircraft, a UAS, and/or other flight platform), a terrestrial platform (e.g., a motor vehicle), or a water born platform (e.g., a watercraft or submarine). In one embodiment, the multispectral imaging system may be mounted to a manned or unmanned aircraft such as a drone. The drone may be flown along power lines extending over large distances. The multispectral imaging system may be used to capture images of high-voltage equipment such as the power lines and associated switchgear along the lines. The system may include memory and one or more processors that cooperate to detect anomalies associated with electrical equipment in the captured images, according to an embodiment. For example, UV images may be used to detect SWUV radiation that may correspond to open flames, corona discharges and/or corona failures. Infrared images may be used, for example, as context to detect fires and excessive heating of electrical equipment. In some embodiments, infrared images may be combined with UV images to help localize the source of such anomalies with a low false alarm rate.

According to an embodiment, the UV camera module in the multispectral imaging system may include, for example, a lens and one or more optical elements that direct ultraviolet light from the lens onto one or more image sensing components such as an inherently solar-blind shortwave ultraviolet light sensor. In some embodiments, images from the longwave infrared and shortwave ultraviolet light sensors in the multispectral imaging system may be combined to form enhanced and/or composite images that help orient a viewer of the images to the locations of SWUV radiation due to thermal and/or corona events.

In one embodiment, a multispectral imaging system includes an infrared light imaging sensor that captures infrared image data in a first spectral band, of a scene and an ultraviolet light imaging sensor that captures ultraviolet image data in a second spectral band, of the scene. The system also includes a processor that combines the ultraviolet image data and the infrared image data to generate composite image data, determines a ratio of a first radiant intensity in the first spectral band to a second radiant intensity in the second spectral band, from the composite image data, and determines whether the ratio corresponds to a predetermined radiant intensity ratio of a known thermal or electrical anomaly. The processor can detect the thermal or electrical anomaly when the determined ratio corresponds to the predetermined radiant intensity ratio.

In another embodiment, a method includes receiving, by one or more processors, infrared image data associated with a first spectral band, of at least a portion of a scene, from an infrared light imaging sensor, and receiving, by the one or more processors, ultraviolet image data associated with a second spectral band, of at least a corresponding portion of the scene from an ultraviolet light imaging sensor. The method also includes combining, by the one or more processors, the ultraviolet image data and the infrared image data to generate composite image data, and determining, by the one or more processors, a ratio of a first radiant intensity in the first spectral band to a second radiant intensity in the second spectral band, from the composite image data. The method also includes determining, by the one or more processors, whether the ratio corresponds to a predetermined radiant intensity ratio of a thermal or electrical anomaly, and detecting, by the one or more processors, at least one of the thermal or electrical anomaly associated with the scene when the ratio corresponds to the predetermined radiant intensity ratio of the thermal or electrical anomaly. The method also includes generating, by the one or more processors, an alert notification in response to the detecting of the at least one of the thermal or electrical anomaly.

In still another embodiment, a monitoring system includes a mobile platform and a camera coupled to the mobile platform. The camera includes a first imaging sensor comprising an infrared light imaging sensor configured to capture infrared image data associated with a first spectral band, of at least a portion of a scene, and a second imaging sensor comprising an ultraviolet light imaging sensor configured to capture ultraviolet image data associated with a second spectral band, of at least a corresponding portion of the scene. The camera also includes a memory configured to store the ultraviolet image data and the infrared image data. The camera also includes at least one processor in communication with the memory and configured to receive the ultraviolet image data and the infrared image data from the memory, combine the ultraviolet image data and the infrared image data to generate composite image data, determine a ratio of a first radiant intensity in the first spectral band to a second radiant intensity in the second spectral band, from the composite image data, determine whether the ratio corresponds to a predetermined radiant intensity ratio of a thermal or electrical anomaly, and detect at least one of the thermal or electrical anomaly associated with the scene when the ratio corresponds to the predetermined radiant intensity ratio of the thermal or electrical anomaly. In some aspects, the mobile platform is configured to carry the camera between various portions of the scene.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
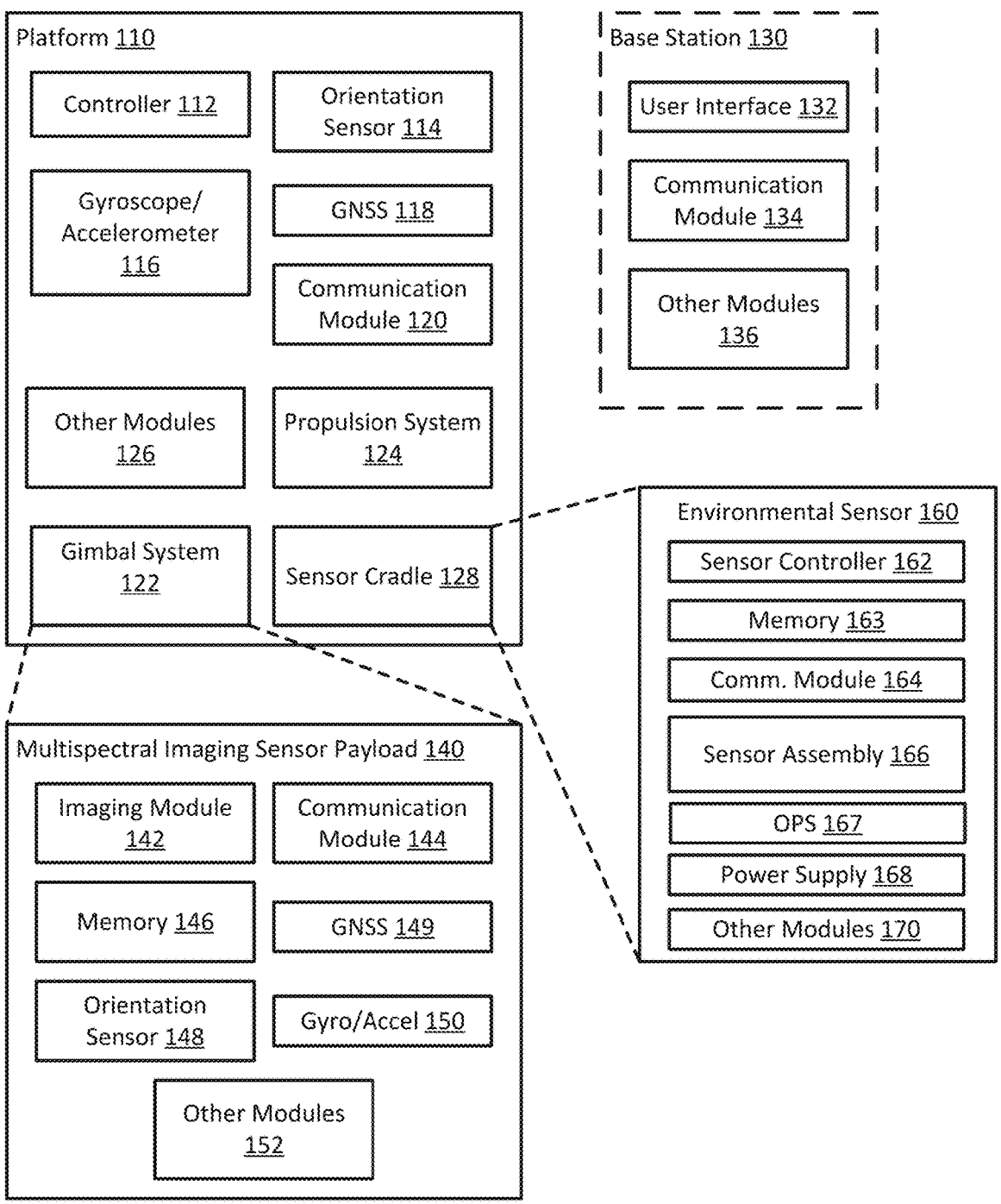
FIG. 1 illustrates a diagram of a multispectral imaging system in accordance with an embodiment of the subject technology.

Multispectral imaging systems and related techniques are specifically designed to detect electrical anomalies, such as corona discharges, and accidental open flames with a high degree of immunity to false alarms by processing a combination of signals from different sensors. A multispectral imaging system consisting of a SWUV sensor acting in concert with a thermal IR camera (or Shortwave-Infrared (SWIR), Near-Infrared (NIR) or visible) can be very effective at excluding false alarms, since a flame can generate the correct proportions of radiation in the various spectral bands. For example, the addition of sensors in different spectral bands can act as a "gate" in concert with an IR sensor to significantly reduce the number of false alarms generated by the system.

The subject technology described herein includes the use of uncooled microbolometer cameras operating in the LWIR band in combination with a SWUV detector. LWIR uncooled microbolometer cameras may be commonly used as infrared cameras for flame detection. A flame detection camera can also operate in the midwave or shortwave IR bands, however, the cost of midwave and shortwave IR cameras can be very significant. Additionally, the midwave IR cameras can have significant maintenance costs when used for continuous monitoring. The LWIR uncooled microbolometer camera may be commonly used for fire monitoring in industrial environments. Visible-light cameras can also be used for the detection of flames, although the flames may be difficult to see in a scene with bright sunlight, and smoke can obscure a visible camera image.

Flames are the combustion of gases, liquids or solids when combined with an oxidizer. The release of chemical energy can manifest itself as discrete spectral features that deviate from the "Planckian" continuum radiation emitted by incandescent solid objects. Hydrocarbon flames can have a host of different chemical reaction channels, and one of the reaction channels is carbon monoxide and oxygen combining into carbon dioxide and emitting UV radiation.

The UV band of most utility for a flame sensor is the shortwave ultraviolet band, or SWUV. A portion of the UV emission from hydrocarbons and other types of flames is in the SWUV band. This radiation lies in the 200 nm to 300 nm portion of the spectrum, also known as UVC or solar-blind UV. The ozone layer may be significantly opaque to radiation at or below 290 nm, so a flame sensor operating in the SWUV band can be presented with a negligible solar background. The sun may not cause false alarms either by direct solar viewing or by "sun glints," which are reflections of the sun off reflective surfaces of metal or glass. Because SWUV photons are significantly energetic, a small number of non-flame related sources can generate SWUV radiation. Both electric arc and gas welding can also emit SWUV radiation, though any conventional flame detection systems would apt to be triggered by welding activity regardless.

Electrical discharges from high-voltage switchgear and natural lightning are also known SWUV sources. Electrical distribution equipment such as power lines and associated switchgear components can suffer from various types of anomalies such as excessive heating, corona discharges and corona failures. These anomalies can be caused by faulty equipment such as dirty insulators, broken strands on a transmission line, or a cracked bushing on a distribution transformer. Early detection of such anomalies can reduce the risk of power failures or dangerous conditions such as downed power lines or fires. Corona detection imaging systems have been developed based on image intensifiers with shortwave ultraviolet transparent windows and photocathodes such as bi-alkali or multi-alkali photocathodes with shortwave ultraviolet responsiveness. However, these systems typically generate low resolution images and are typically operated at a high operating gain that results in poor image quality. Ultraviolet images captured by conventional corona detection imaging systems commonly include noise in the form of bright artifacts that occur continuously in random parts of the image. These artifacts can be difficult to distinguish from a corona event. It can therefore be difficult or impossible to perform automatic detection of corona events using conventional imaging systems, due to false alarms generated in response to image artifacts. It can also be difficult or impossible to distinguish between different types of electrical anomalies using the relatively low-resolution images generated by conventional systems.

In some aspects, SWUV radiation is not emitted by blackbody emitters in significant amounts except at temperatures at or above 2000° C., which is significantly hotter than any exhaust pipe in operation. Additionally, SWUV radiation is not present in the solar radiation at the surface of the Earth due to ozone layer absorption. SWUV radiation can be emitted in small amounts by many types of flames, including hydrocarbon flames and burning metal such as aluminum or magnesium. Yet incandescent objects can emit negligible SWUV radiation until they are heated above 3000° C. Consequently, a SWUV sensor with an adjustable alarm threshold can be triggered by various types of flames while simultaneously being immune to triggers induced by incandescent sources. For example, a typical flame may be present as an incandescent blackbody with a temperature of about 500° F., which can emit about 1e-35 watts/$cm^2$/steradian in the SWUV band, which corresponds to about 1 photon/$cm^2$ every 600 million years. There may be about 35 orders of magnitude more 7-14-micron LWIR radiance from that incandescent blackbody relative to the SWUV band radiance. A blackbody emitter at 500° F. may not trigger a SWUV sensor.

Consequently, a multispectral imaging system that combines thermal infrared sensing with SWUV sensing can be nearly immune to false alarms generated by incandescent sources that may be perceived as identical to an open flame when detected by a LWIR camera operating by itself. In some aspects, the multispectral imaging system, however, may be triggered by welding or torch-cutting operations that involve a very hot emitter or oxy-acetylene flames, and the multispectral imaging system can be significantly less sensitive to hot exhaust pipes.

In one or more embodiments, the false alarm rate may be relatively low with occurrence of dual conditions, in which a hot spot is detected to have an apparent temperature that exceeds a preset threshold (e.g., 300° F.), combined with detection of a shortwave ultraviolet source that exceeds a preset radiant intensity threshold. Additional "gating" to further reduce false alarms can involve machine-learning algorithms, using one or more neural networks, that evaluate temporal and spatial signatures of the hot spot as observed by the LWIR camera. The temporal signature of many fires has a low-frequency flicker. This oscillation pattern occurs as oxygen in the immediate vicinity of the fire is consumed, leading to a reduction in flame intensity, which then leads to an inrush of oxygen that increases flame intensity, and then the cycle is repeated. It is possible, however, that certain environmental conditions such as windy conditions can lead to a very different temporal signature of a flame by continuously replenishing the oxygen and sweeping away non-flammable combustion products. Another infrared signature of a fire is an increasing temperature and size of the hot spot. The exhaust stack on heavy machinery in industrial environments can exhibit a similar type of monotonic increase in apparent temperature, particularly when the diesel engine transitions into a regeneration mode, whereby the exhaust system temperature is increased by way of extra fuel injection to burn off carbon soot that accumulates in the diesel particulate filter. This type of activity can be accounted for during the training of the machine learning algorithms to reduce the possibility of detecting a false flame.

In one or more embodiments, the multispectral imaging system can be installed as a fixed-mount system, on a pan/tilt unit (PTU) or unmanned ground system for fire monitoring. Such multispectral imaging capture and processing techniques can be used with aircraft as well, including unmanned aerial systems. In another embodiment, a long-range monitoring system built with zoom optics on the different spectral channel sensors can be mounted on a high-elevation tower to scan a large area for flames.

In addition to the above, embodiments may be made relatively compactly, thereby reducing size, weight, and power requirements (relative to conventional systems), and are therefore suitable for deployment in various applications such as relatively small unmanned terrestrial vehicles and aircraft systems. Modern manned and unmanned mobile platforms, including unmanned sensor platforms, such as unmanned aerial vehicles (UAVs), remotely operated underwater vehicles (ROVs), unmanned (water) surface vehicles (USVs), and unmanned ground vehicles (UGVs), can operate over long distances and in all environments. Such systems typically rely on a portable power source that can limit their range of travel. Embodiments described herein provide relatively lightweight, compact, and featureful multispectral imaging systems that typically increase the achievable range of such mobile platforms, including unmanned sensor platforms, which can be particularly helpful when attempting to navigate within a survey area relatively quickly and exhaustively.

FIG. 1 illustrates a block diagram of multispectral imaging system 100 in accordance with an embodiment of the subject technology. In some embodiments, system 100 may be configured to fly over a scene, through a structure, or approach a target and image or sense the scene, structure, or target, or portions thereof, using gimbal system 122 to aim multispectral imaging sensor payload 140 and/or sensor cradle 128 to aim environmental sensor 160 at the scene, structure, or target, or portions thereof. Resulting imagery and/or other sensor data may be processed (e.g., by multispectral imaging sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or other sensor data to control operation of platform 110, multispectral imaging sensor payload 140, and/or environmental sensor 160, as described herein, such as controlling gimbal system 122 to aim multispectral imaging sensor payload 140 towards a particular direction, controlling propulsion system 124 to move and/or orient platform 110 to a desired position/orientation in a scene or structure or relative to a target, or controlling other modules 126 to deploy a retardant agent towards a scene to extinguish any detected thermal radiation such as open flames.

In additional embodiments, system 100 may be configured to use platform 110 and/or sensor cradle 128 to position and/or orient environmental sensor 160 at or relative to the scene, structure, or target, or portions thereof. Resulting sensor data may be processed (e.g., by environmental sensor 160, platform 110, and/or base station 130) and displayed to a user through use of user interface 132 (e.g., one or more displays such as MFD, a portable electronic device such as a tablet, laptop, or smart phone, or other appropriate interface) and/or stored in memory for later viewing and/or analysis. In some embodiments, system 100 may be configured to use such sensor data to control operation of platform 110 and/or environmental sensor 160, as described herein, such as controlling propulsion system 124 to move and/or orient platform 110 to a desired position in a scene or structure or relative to a target.

In the embodiment shown in FIG. 1, multispectral imaging system 100 includes platform 110, optional base station 130, and at least one multispectral imaging sensor payload 140. Platform 110 may be a mobile platform configured to move or fly and position multispectral imaging sensor payload 140 and/or environmental sensor 160 (e.g., relative to a designated or detected target). In other embodiments, the platform 110 may be a fixed-mount platform at a high-elevation configuration to scan a large open area with multispectral imaging sensor payload 140. As shown in FIG. 1, platform 110 may include one or more of a controller 112, an orientation sensor 114, a gyroscope/accelerometer 116, a global navigation satellite system (GNSS) 118, a communication module 120, a gimbal system 122, a propulsion system 124, a sensor cradle 128, and other modules 126. Operation of platform 110 may be substantially autonomous and/or partially or completely controlled by optional base station 130, which may include one or more of a user interface 132, a communication module 134, and other modules 136. In other embodiments, platform 110 may include one or more of the elements of base station 130, such as with various types of manned aircraft, terrestrial vehicles, and/or surface or subsurface watercraft.

Multispectral imaging sensor payload 140 and/or environmental sensor 160 may be physically coupled to platform 110 and be configured to capture sensor data (e.g., infrared images in the longwave infrared band, ultraviolet images in the shortwave ultraviolet band, visible images, narrow aperture radar data, analyte sensor data, directional radiation data, and/or other sensor data) of a target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or multispectral imaging sensor payload 140.

In some embodiments, controller 112 may be configured to substantially continuously monitor and/or store the status of and/or sensor data provided by one or more elements of platform 110, multispectral imaging sensor payload 140, environmental sensor 160, and/or base station 130, such as the position and/or orientation of platform 110, multispectral imaging sensor payload 140, and/or base station 130, for example, and the status of a communication link established between platform 110, multispectral imaging sensor payload 140, environmental sensor 160, and/or base station 130. Such communication links may be configured to be established and then transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, multispectral imaging sensor payload 140, and/or other elements of system 100, and providing such measurements as sensor signals and/or data that may be communicated to various devices of system 100.

Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communication module 120 may be implemented as any wired and/or wireless communication module configured to transmit and receive analog and/or digital signals between elements of system 100. For example, communication module 120 may be configured to receive flight control signals and/or data from base station 130 and provide them to controller 112 and/or propulsion system 124. In other embodiments, communication module 120 may be configured to receive images and/or other sensor information (e.g., visible spectrum, infrared, and/or ultraviolet still images or video images) from multispectral imaging sensor payload 140 and relay the sensor data to controller 112 and/or base station 130. In further embodiments, communication module 120 may be configured to receive sensor data and/or other sensor information from environmental sensor 160 and relay the sensor data to controller 112 and/or base station 130. In some embodiments, communication module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communication module 120 may be configured to monitor the status of a communication link established between platform 110, multispectral imaging sensor payload 140, and/or base station 130. Such status information may be provided to controller 112, for example, or transmitted to other elements of system 100 for monitoring, storage, or further processing, as described herein. Communication links established by communication module 120 may be configured to transmit data between elements of system 100 substantially continuously throughout operation of system 100, where such data includes various types of sensor data, control parameters, and/or other data, as described herein.

In some embodiments, gimbal system 122 may be implemented as an actuated gimbal mount, for example, that may be controlled by controller 112 to stabilize multispectral imaging sensor payload 140 relative to a target or to aim multispectral imaging sensor payload 140 according to a desired direction and/or relative position. As such, gimbal system 122 may be configured to provide a relative orientation of multispectral imaging sensor payload 140 (e.g., relative to an orientation of platform 110) to controller 112 and/or communication module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/multispectral imaging sensor payload 140. In further embodiments, gimbal system 122 may be configured to couple to a laser pointer, range finder, and/or other device, for example, to support, stabilize, power, and/or aim multiple devices (e.g., multispectral imaging sensor payload 140 and one or more other devices) substantially simultaneously. In alternative embodiments, multispectral imaging sensor payload 140 may be fixed to mobile platform 110 such that gimbal system 122 is implemented as a fixed perspective mounting system for multispectral imaging sensor payload 140.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communication modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, an analyte detection system, a radar system, a proximity sensor, a visible spectrum camera or infrared/thermal camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a thermal or electrical anomaly in proximity to platform 110. In various embodiments, controller 130 may be configured to use such proximity and/or position information to help safely pilot platform 110 and/or monitor communication link quality, as described herein. In some embodiments, other modules 126 may include a reservoir containing a type of retardant agent for deployment at or near a scene, structure, target, or portions thereof, to extinguish a fire or open flames.

In various embodiments, sensor cradle 128 may be implemented as a latching mechanism that may be permanently mounted to platform 110 to provide a mounting position and/or orientation for environmental sensor 160 relative to a center of gravity of platform 110, relative to propulsion system 124, and/or relative to other elements of platform 110. In addition, sensor cradle 128 may be configured to provide power, support wired communications, and/or otherwise facilitate operation of environmental sensor 160, as described herein. As such, sensor cradle 128 may be configured to provide a power, telemetry, and/or other sensor data interface between platform 110 and environmental sensor 160. In some embodiments, gimbal system 122 may be implemented similarly to sensor cradle 128, and vice versa.

For example, sensor cradle 128 may be implemented as an actuated gimbal mount, for example, that may be controlled by controller 112 to stabilize environmental sensor 160 relative to a target or to aim environmental sensor 160 according to a desired direction and/or relative position. As such, sensor cradle 128 may be configured to provide a relative orientation of environmental sensor 160 (e.g., relative to an orientation of platform 110) to controller 112 and/or communication module 120 (e.g., sensor cradle 128 may include its own orientation sensor 114). In other embodiments, sensor cradle 128 may be implemented as a gravity driven mount (e.g., non-actuated). In further embodiments, sensor cradle 128 may be configured to couple to a laser pointer, range finder, and/or other device, for example, to support, stabilize, power, and/or aim multiple devices (e.g., environmental sensor 160 and one or more other devices) substantially simultaneously.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals. In other examples, user interface 132 may be adapted to display an IR video stream having an overlay that indicates that UV radiation has been detected on a portion of a power line and displays a relative strength of the UV radiation signal, to facilitate assessment of the UV anomaly by a UAS operator (or pilot).

In some embodiments, user interface 132 may be adapted to accept user input including a user-defined target destination, heading, waypoint, route, and/or orientation for an element of system 100, for example, and to generate control signals to cause platform 110 to move according to the target destination, heading, route, and/or orientation, or to aim multispectral imaging sensor payload 140 or environmental sensor 160 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., multispectral imaging sensor payload 140 or environmental sensor 160) associated with platform 110, for example, and to generate control signals for adjusting an orientation and/or position of the actuated device according to the target attitude, orientation, and/or position. Such control signals may be transmitted to controller 112 (e.g., using communication modules 134 and 120), which may then control platform 110 accordingly.

Communication module 134 may be implemented as any wired and/or wireless communication module configured to transmit and receive analog and/or digital signals between elements of system 100. For example, communication module 134 may be configured to transmit flight control signals from user interface 132 to communication module 120 or 144. In other embodiments, communication module 134 may be configured to receive sensor data (e.g., visible spectrum, infrared, and/or ultraviolet still images or video images, or other sensor data) from multispectral imaging sensor payload 140. In some embodiments, communication module 134 may be configured to support spread spectrum transmissions, for example, and/or multiple simultaneous communications channels between elements of system 100. In various embodiments, communication module 134 may be configured to monitor the status of a communication link established between base station 130, multispectral imaging sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communication modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared or thermal camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where multispectral imaging sensor payload 140 is implemented as an imaging device, multispectral imaging sensor payload 140 may include imaging module 142, which may be implemented as a cooled and/or uncooled array of detector elements, such as visible spectrum, infrared, and/or ultraviolet sensitive detector elements, including quantum well infrared photodetector elements, bolometer or microbolometer based detector elements, type II superlattice based detector elements, and/or other infrared spectrum detector elements that can be arranged in a focal plane array (FPA) (e.g., along with other detector elements sensitive to other spectrums). In various embodiments, imaging module 142 may be implemented with a complementary metal oxide semiconductor (CMOS) based FPA of detector elements that are sensitive to portions of the LWIR and SWUV spectrums simultaneously. In various embodiments, imaging module 142 may include one or more logic devices (e.g., similar to controller 112) that can be configured to process imagery captured by detector elements of imaging module 142 before providing the imagery to memory 146 or communication module 144. More generally, imaging module 142 may be configured to perform any of the operations or methods described herein, at least in part, or in combination with controller 112 and/or user interface 132.

In some embodiments, multispectral imaging sensor payload 140 may be implemented with a second or additional imaging modules similar to imaging module 142, for example, that may include detector elements configured to detect other electromagnetic spectrums, such as visible light, thermal, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communication module 144 of multispectral imaging sensor payload 140 may be implemented as any wired and/or wireless communication module configured to transmit and receive analog and/or digital signals between elements of system 100. For example, communication module 144 may be configured to transmit images from imaging module 142 to communication module 120 or 134. In other embodiments, communication module 144 may be configured to receive control signals (e.g., control signals directing capture, focus, selective filtering, and/or other operation of multispectral imaging sensor payload 140) from controller 112 and/or user interface 132. In some embodiments, communication module 144 may be configured to support spread spectrum transmissions, for example, and/or multiple simultaneous communications channels between elements of system 100. In various embodiments, communication module 144 may be configured to monitor the status of a communication link established between multispectral imaging sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, electromagnetic spectrum images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of multispectral imaging sensor payload 140 may be implemented similar to orientation sensor 114 or gyroscope/accelerometer 116, and/or any other device capable of measuring an orientation of multispectral imaging sensor payload 140, imaging module 142, and/or other elements of multispectral imaging sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of multispectral imaging sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of multispectral imaging sensor payload 140 and/or various elements of multispectral imaging sensor payload 140 and providing such measurements as sensor signals that may be communicated to various devices of system 100. GNSS 149 may be implemented similar to GNSS 118 and/or any other device capable of measuring a position of multispectral imaging sensor payload 140, imaging module 142, and/or other elements of multispectral imaging sensor payload 140 and providing such measurements as sensor signals that may be communicated to various devices of system 100.

Other modules 152 of multispectral imaging sensor payload 140 may include other and/or additional sensors, actuators, communication modules/nodes, cooled or uncooled optical filters, and/or user interface devices used to provide additional environmental information associated with multispectral imaging sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In various embodiments, environmental sensor/sensor payload 160 may be implemented as an environmental sensor configured to generate environmental sensor data corresponding to the environment surrounding platform 110. In the embodiment shown in FIG. 1, environmental sensor 160 includes sensor controller 162, memory 163, communication module 164, sensor assembly 166, orientation and/or position sensor (OPS) 167, power supply 168, and other modules 170. In various embodiments, sensor assembly 166 may be implemented with sensor elements configured to detect the presence of and/or generate sensor data corresponding to hazardous analytes, ionizing radiation, emissivities, thermal radiation, radio frequency signals, and/or other environmental conditions proximate to or in view of platform 110 and/or environmental sensor 160.

Sensor controller 162 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of environmental sensor 160 and/or other elements of environmental sensor 160, for example. Such software instructions may also implement methods for processing sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by sensor controller 162. In these and other embodiments, sensor controller 162 may be implemented with other components where appropriate, such as volatile memory, non-volatile memory, one or more interfaces, and/or various analog and/or digital components for interfacing with modules of environmental sensor 160 and/or devices of system 100. For example, sensor controller 162 may be adapted to store sensor signals, sensor information, parameters for coordinate frame transformations, calibration parameters, sets of calibration points, and/or other operational parameters, over time, for example, and provide such stored data to a user using user interface 132. In some embodiments, sensor controller 162 may be integrated with one or more other elements of environmental sensor 160, for example, or distributed as multiple logic devices within platform 110, base station 130, and/or environmental sensor 160.

In some embodiments, sensor controller 162 may be configured to substantially continuously monitor and/or store the status of and/or store sensor data provided by one or more elements of sensor assembly 166 of environmental sensor 160, such as the position and/or orientation of platform 110, environmental sensor 160, and/or base station 130, for example, and the status of a communication link established between platform 110, environmental sensor 160, and/or base station 130. Such communication links may be configured to be established and then transmit data between elements of system 100 substantially continuously throughout operation of system 100, where such data includes various types of sensor data, control parameters, and/or other data.

Memory 163 may be implemented as one or more machine readable mediums and/or logic devices configured to store software instructions, sensor signals, control signals, operational parameters, calibration parameters, sensor data, and/or other data facilitating operation of environmental sensor 160 and/or other elements of system 100, for example, and provide it to various elements of system 100. Memory 163 may also be implemented, at least in part, as removable memory, such as a secure digital memory card for example including an interface for such memory.

Communication module 164 of environmental sensor 160 may be implemented as any wired and/or wireless communication module configured to transmit and receive analog and/or digital signals between elements of system 100. For example, communication module 164 may be configured to transmit sensor data from environmental sensor 160 and/or sensor assembly 166 to communication module 120 of platform 110 (e.g., for further transmission to base station 130) or directly to communication module 134 of base station 130. In other embodiments, communication module 164 may be configured to receive control signals (e.g., control signals directing operation of environmental sensor 160) from controller 112 and/or user interface 132. In some embodiments, communication module 164 may be configured to support spread spectrum transmissions, for example, and/or multiple simultaneous communications channels between elements of system 100.

Sensor assembly 166 may be implemented with one or more sensor element supports (e.g., printed circuit boards "PCBs"), connectors, sensor elements, and/or other modules configured to facilitate operation of environmental sensor 160. In a particular embodiment, environmental sensor 160 may be implemented as a relatively high resolution visible spectrum camera (e.g., an HD or 2K or 4K visible spectrum camera) and sensor assembly 166 may be implemented as a relatively high resolution FPA of visible spectrum sensitive detector elements configured to generate relatively high-resolution imagery and/or video of a scene imaged substantially simultaneously by multispectral imaging sensor payload 140.

Orientation and/or position sensor (OPS) 167 of environmental sensor 160 may be implemented similar to orientation sensor 114, gyroscope/accelerometer 116, GNSS 118, and/or any other device capable of measuring an orientation and/or position of environmental sensor 160, sensor assembly 166, and/or other elements of environmental sensor 160 (e.g., magnitude and direction of roll, pitch, and/or yaw, relative to one or more reference orientations such as gravity and/or Magnetic North, along with an absolute or relative position) and providing such measurements as sensor signals that may be communicated to various devices of system 100.

Power supply 168 may be implemented as any power storage device configured to provide enough power to each sensor element of sensor assembly 166 to keep all such sensor elements active and able to generate sensor data while environmental sensor 160 is otherwise disconnected from external power (e.g., provided by platform 110 and/or base station 130). In various embodiments, power supply 168 may be implemented by a supercapacitor so as to be relatively lightweight and facilitate flight of platform 110 and/or relatively easy handheld operation of platform 110 (e.g., where platform 110 is implemented as a handheld sensor platform).

Other modules 170 of environmental sensor 160 may include other and/or additional sensors, actuators, communication modules/nodes, and/or user interface devices used to provide additional environmental information associated with environmental sensor 160, for example. In some embodiments, other modules 170 may include a humidity sensor, a wind and/or water temperature sensor, a barometer, a GNSS, and/or other environmental sensors providing measurements and/or other sensor signals that can be displayed to a user and/or used by sensor controller 162 or other devices of system 100 (e.g., controller 112) to provide operational control of platform 110 and/or system 100 or to process sensor data to compensate for environmental conditions, as described herein.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
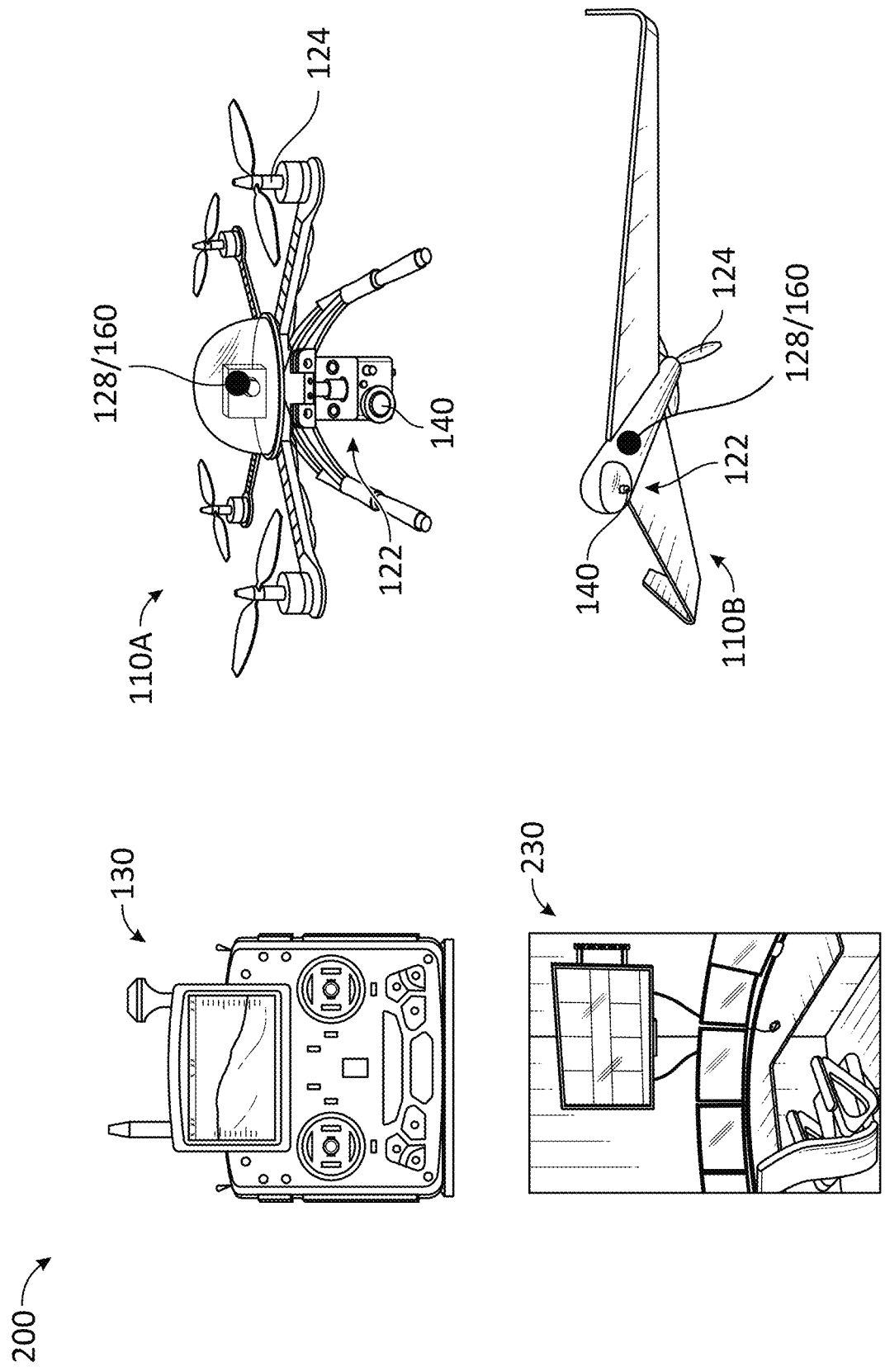
FIG. 2 illustrates a diagram of fixed-mount and mobile platforms employing a multispectral imaging system in accordance with an embodiment of the subject technology.

FIG. 2 illustrates a diagram of mobile platforms 110A and 110B of multispectral imaging system 200 including embodiments of environmental sensor 160 and associated sensor cradle 128 in accordance with an embodiment of the subject technology. In the embodiment shown in FIG. 2, multispectral imaging system 200 includes base station 130, optional co-pilot station 230, mobile platform 110A with articulated imaging system/multispectral imaging sensor payload 140, gimbal system 122, environmental sensor 160, and sensor cradle 128, and mobile platform 110B with articulated imaging system/multispectral imaging sensor payload 140, gimbal system 122, environmental sensor 160, and sensor cradle 128, where base station 130 and/or optional co-pilot station 230 may be configured to control motion, position, orientation, and/or general operation of platform 110A, platform 110B, sensor payloads 140, and/or environmental sensors 160.

In various embodiments, co-pilot station 230 may be implemented similarly relative to base station 130, such as including similar elements and/or being capable of similar functionality. In some embodiments, co-pilot station 230 may include a number of displays so as to facilitate operation of environmental sensor 160 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any of the display views described herein.

As described herein, embodiments of multispectral imaging system 100 may be implemented with a relatively compact, low weight, and low power multispectral imaging system (e.g., multispectral imaging sensor payload 140) that can be used to detect LWIR thermal energy in concert with SWUV radiation, such as through composite imaging with overlaid information about the localized detections, where processed imagery and/or display views are provided to an operator to facilitate assessment of the SWUV radiation and to facilitate any actions through the mobile platform, such as deploying a retardant agent for extinguishing any open flames confirmed as SWUV radiation, for example.

In some embodiments, the multispectral imaging system may include an imaging module implemented by a CMOS based FPA formed, fabricated, assembled, and/or otherwise configured to have sensitivity in the IR and UV spectrums/bands. Such imaging module may include a UV bandpass filter configured to filter out undesirable levels of background noise from out-of-band radiation in the FPA such that each image captured by the multispectral imaging module includes IR and UV information about each scene imaged by the multispectral imaging module. In particular embodiments, such FPA may be sensitive to portions of the SWUV spectrums, including at least 200 nm-290 nm (SWUV), and the UV bandpass filter may be configured to selectively pass such bands, i.e. radiation at wavelengths longer than the desired filter cutoff.

In various embodiments, multispectral imaging sensor payload 140 may be equipped with a lens system that is achromatic across the spectral bands captured by imaging module 142. Such lens system may be implemented with a focal length chosen to provide a relatively wide field of view (FOV) that is sufficient with respect to UAS imaging FOV performance requirements (e.g., directing a narrow field of view in undesirable environmental conditions).

In some embodiments, multispectral imaging sensor payload 140 may be configured to process captured imagery according to multispectral image analytics and/or algorithms (e.g., onboard or after transmission to other processing elements of system 100) configured to classify scene pixels according to their likelihood of being part of a particular class of object. For example, an open flame, being a hot spot in the LWIR band and a bright spot in the SWUV band. Similarly, a corona discharge, can be detected as a hot spot in the LWIR band and a bright spot in the SWUV band. Both scene elements can therefore be reliably classified based, at least in part, on their spectral characteristics. In various embodiments, such multispectral image analytics and/or algorithms may be performed by a convolutional neural network (CNN) implemented within multispectral imaging sensor payload 140, for example, or within one or more controllers associated with multispectral imaging system 100. As used herein, the terms "hot spot" and "bright spot" may refer to an area within an imaged scene in the infrared band and the shortwave ultraviolet band, respectively, that includes pixels having intensity values that are significantly greater than surrounding pixels of the imaged scene. The terms "hot spot" and "bright spot" also can be referred to as a "scene-relative hot spot" and "scene-relative bright spot," respectively.

Figure 3:
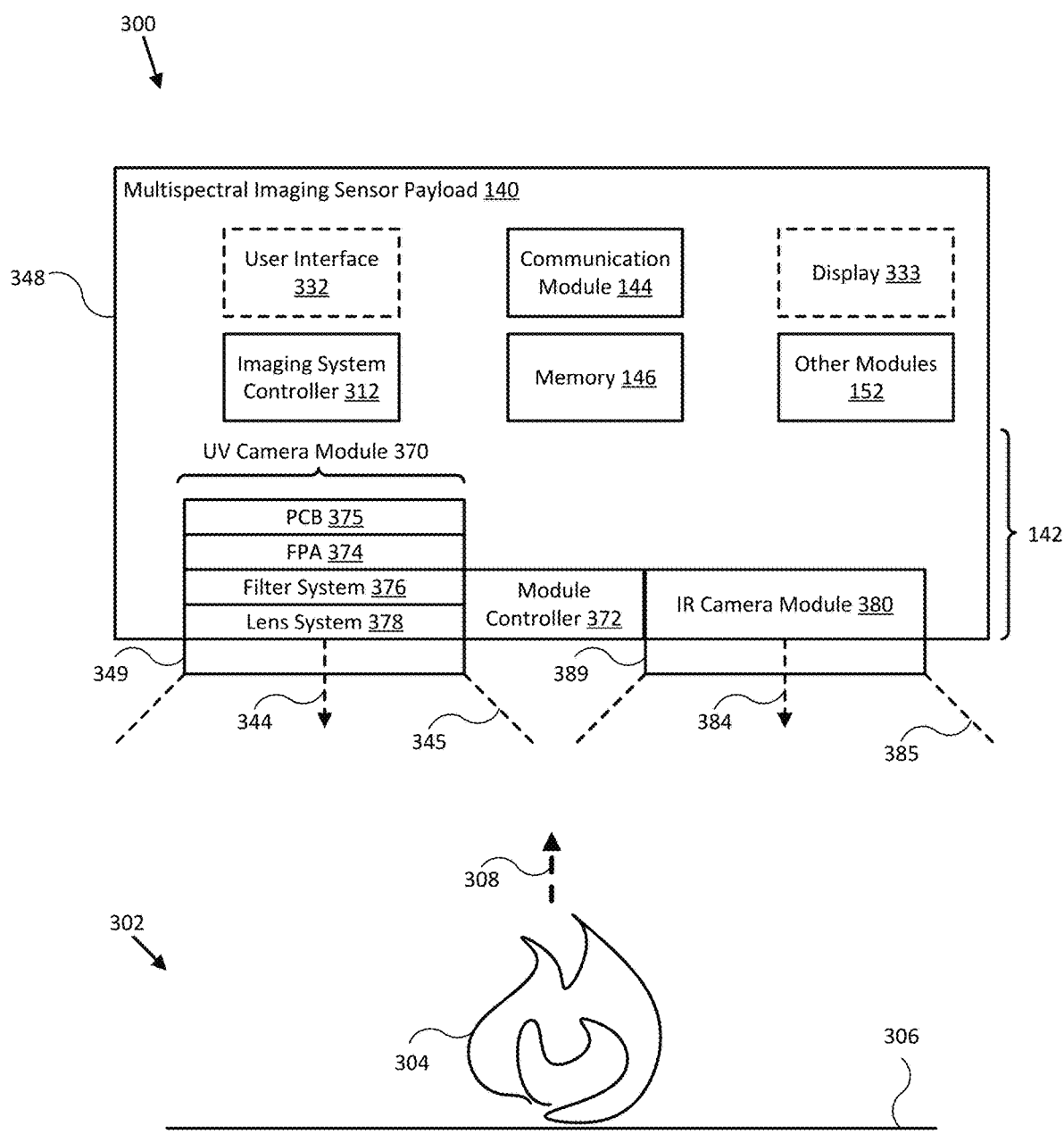
FIG. 3 illustrates a diagram of a multispectral imaging device for a multispectral imaging system in accordance with an embodiment of the subject technology.

FIG. 3 illustrates a diagram of multispectral imaging sensor payload 140 for system 100 and/or 300 in accordance with an embodiment of the subject technology. In FIG. 3, imaging module 142 includes UV camera module 370 including multispectral FPA 374 receiving electromagnetic radiation 308 from scene 302 through filter system 376, lens system 378, and/or optional shutter 349 along optical axis 344 and according to FOV 345. In various embodiments, imaging module 142 may include a printed circuit board (PCB) 375 or similar structure configured to support FPA 374 and couple FPA 374 and/or other elements of imaging module 142 to module controller 372 of imaging module 142. As described herein, filter system 376 may in some embodiments be implemented as a UV bandpass filter configured to provide differentiated spectrums (e.g., portions of UV spectrums) to pixels of FPA 374. In various embodiments, filter system 376 is adapted to block light having wavelengths longer than about 260 nanometers and to pass light having wavelengths shorter than about 260 nanometers. As also described herein, lens system 378 may be achromatic with respect to the differentiated spectrums provided to pixels of FPA 374, for example, and be configured to provide FOV 345. In other embodiments, the lens system 378 may not be achromatic based at least on dimensions of the detector area of the FPA 374 (e.g., the detector area may be on the order of millimeters across). In some embodiments, lens system 378 may be actuated so as to adjust FOV 345, a zoom level of multispectral imaging sensor payload 140, a rotation angle of multispectral imaging sensor payload 140, and/or a focus of light conveyed to FPA 374. In other embodiments, lens system 378 may be a fixed lens system. The imaging module 142 also includes IR camera module 380 receiving the electromagnetic radiation 308 from scene 302 through optional shutter 389 along optical axis 384 and according to FOV 385. In various embodiments, the UV camera module 370 is boresighted to the optical axis 384 of IR camera module 380.

Module controller 372 may be implemented as any appropriate processing device (e.g., microcontroller, processor, application specific integrated circuit (ASIC), field programmable gate array (FPGA), or other logic device) that may be used by imaging module 142 and/or multispectral imaging sensor payload 140 to execute appropriate instructions, such as software instructions and/or signal processing operations for, for example, capturing multispectral images of scene 302 using IR camera module 380 and/or UV camera module 370 including FPA 374, filter system 376, lens system 378, and/or optional shutter 349, generating a composite image from such multispectral images, and/or classifying pixels in such images associated with object 304 (e.g., depicted as an open flame, or a corona discharge) and/or background 306 within scene 302 (e.g., using a CNN implemented within module controller 372). Further, module controller 372 may be implemented with various signal processing devices, such as analog to digital converters (ADCs), trigger inputs, timing circuitry, and other signal or sensor processing devices as described herein.

FPA 374 may be implemented by a solar-blind shortwave ultraviolet light imaging sensor. In various embodiments, the solar-blind shortwave ultraviolet light imaging sensor may be implemented as a gas-filled tube having a cathode-anode internal assembly, where the anode is comprised of a two-dimensional planar grid with an active area that allows UV radiation to pass through and strike the photocathode. In some embodiments, FPA 374 may be implemented by a two-dimensional planar array of similarly fabricated/sized pixel structures each configured to be sensitive across the full spectral band of imaging module 142. In other embodiments, FPA 374 may be implemented by an array of structurally differentiated pixel structure subarrays, where each subarray is sensitive to a differentiated subset of the full spectral band of imaging module 142, for example, and/or may be non-planar (e.g., concave with respect to optical axis 344), three dimensional (e.g., multilayered), and/or may include size differentiated pixels (e.g., with larger surface areas as the distance to optical axis 344 increases).

In an embodiment, FPA 374 may be implemented with silicon complementary metal-oxide-semiconductor (CMOS) sensors that may have spectral response curves that extend to 1000 nm, and the response is higher for wavelengths longer than the SWUV band limit of 300 nm. In some aspects, these two factors may make a silicon based SWUV camera more sensitive to spurious signals from hot objects such as exhaust pipes. Silicon based detectors may also be adversely impacted from eventual damage from SWUV radiation exposure, which then leads to lower spectral response and higher spectral noise. In another embodiment, FPA 374 may be implemented with backside-illuminated silicon charge coupled device (CCD) sensors that can have a higher SWUV spectral response, however, they may be significantly higher in cost compared to conventional CCD arrays. In some aspects of the embodiment, a wave-shifting fluorescent coating can be applied to an array of backside-illuminated silicon CCD sensors to increase its spectral response in the SWUV band. In other aspects of the embodiment, the backside-illuminated silicon CCD sensor can be implemented with a bandpass filter that is adapted to block undesired radiation above 290 nm.

In other embodiments, FPA 374 may be implemented with image intensifier devices that are sensitive to SWUV radiation and have higher sensitivity than a silicon CMOS sensor or any other similar imaging sensor. In some aspects, the image intensifier device includes an inherently solar-blind SWUV photocathode. The image intensifier device may be implemented with a bandpass filter to control the spectral response in the SWUV band in some embodiments, or the image intensifier device may be implemented without a bandpass filter in other embodiments. In some aspects, the image intensifier devices may have an operation life that is lesser than LWIR microbolometer cameras. In an embodiment, the image intensifier device may be implemented with additional imaging technology to couple a phosphor output screen into a digital image stream. The multispectral imaging system implemented with the UV camera module 370 including the image intensifier device may be capable of imaging flames or corona discharges even in the presence of bright sunlight.

In other embodiments, FPA 374 may be implemented with wide bandgap detectors. For example, the wide bandgap (WBG) sensors may include staring arrays of solid-state photon detectors that are inherently insensitive to wavelengths longer than the 290 nm ozone cutoff. The WBG sensors may be formed of aluminum gallium nitride alloys, silicon carbide, diamond, or the like. In one or more embodiments, PCB 375 may be implemented with a CMOS based Readout Integrated Circuit (ROIC) that can support high voltages needed to reverse-bias the WBG sensors (e.g., at about 5 eV). In some aspects, the WBG sensors may have cost and performance advantages over silicon based sensors. For example, a WBG sensor can be integrated into a multispectral imaging system with a significantly lower cost bandpass filter relative to the cost of the bandpass filter implemented with a silicon-based sensor. In some embodiments, the FPA 374 including the WBG sensors may be implemented without a bandpass filter and adapted to operate the multispectral imaging system independent of any bandpass filter provided that the WBG sensor has a bandgap energy that exceeds a predetermined bandgap energy threshold. In this respect, eliminating the bandpass filter from a WBG sensor implementation can provide advantages over conventional imaging systems by improving the SWUV radiation signal, since a conventional bandpass filter with a relatively high rejection ratio that is implemented with a silicon-based sensor has undesired transmission characteristics at its center wavelength.

Conventional SWUV band sensors face challenges in having both the required sensitivity in the SWUV band and minimal (or negligible) levels of background noise from out-of-band radiation, i.e. radiation at wavelengths longer than the desired filter cutoff. Conventional imaging sensors that operate in the SWUV band also have Longwave UV (LWUV), visible and infrared response. This undesirable spectral response needs to be controlled with specified UV bandpass filters. Conventional UV bandpass filters have typical out-of-band rejection ratios of about $10^4$, however, this performance metric may be insufficient if a radiation source, such as a flame or hot exhaust pipe, in the field of view of the image sensor has a radiance that is greater than the desired cutoff wavelength. Other conventional bandpass filters may exist with out-of-band rejection ratios as high as $10^{12}$, however, these bandpass filters are not cost effective and generally have low in-band transmission values, thus making them a less desirable implementation when used with a detector semiconductor material such as silicon.

In various embodiments, filter system 376 may be implemented as a static bandpass filter structure deposited or otherwise attached to an active surface of FPA 374, for example, or may be implemented as an adjustable or controllable bandpass filter structure or other type of filter structure configured to provide pixel- or FPA-portion-differentiated spectral illumination of FPA 374. More generally, filter system 376 may be configured to provide spatially and spectrally differentiated illumination of FPA 374 according to one or more different spectrums, each of which may be full differentiated or may partially overlap an adjacent differentiated spectrum. In one embodiment, the characteristics of filter system 376 may include a SWUV band of 200 nm-300 nm, such that out-of-band radiation signals beyond the 300 nm band are excluded by the filter system 376, for example.

In various embodiments, lens system 378 may be implemented as an ultraviolet light transmissive lens that is arranged laterally along an optical axis from the UV camera module 370 implemented as a solar-blind shortwave ultraviolet light imaging sensor by a predetermined focal length distance. Lens system 378 may be implemented with one or more lenses each configured to pass light to substantially all pixels of FPA 374, for example, or may be implemented with an array of lenses (e.g., a microlens array) each configured to pass light to a subset of pixels of FPA 374. In general, in embodiments where FPA is sensitive to the NIR, VIS, and LWUV bands, as described herein, each lens of lens system 378 may be configured to be color corrected or achromatic from 330-1100 nm. In some embodiments, FOV 345 may be asymmetrical (e.g., to match a corresponding FPA dimension).

While the embodiment depicted by FIG. 3 shows a relatively compact multispectral imaging sensor payload 140 implemented with a single multispectral imaging module 142 capable of providing single perspective multispectral imagery of scene 302, in other embodiments, multispectral imaging sensor payload 140 may be implemented with multiple imaging modules 142 each sensitive to individually differentiated spectrums, for example, and/or each providing different perspectives of scene 302, such as according to different optical axes and/or different FOVs.

PCB 375 may be a conventional printed circuit board, for example, and be adapted to provide electrical access to FPA 374 and/or other elements of imaging module 142 (e.g., through various metal traces) as well as physical support for FPA 374 and/or other elements of imaging module 142. In various embodiments, PCB 375 is implemented with a driver circuit for controlling FPA 374 and for serving as an output interface to one or more of imaging system controller 312, user interface 332, communication module 144, memory 146, display 333, or other modules 152.

In some embodiments, each of shutters 349 and 389 may be implemented as a mechanical or removable light shield adapted to selectively block one or more bands of electromagnetic radiation 308. In various embodiments, each of shutters 349 and 389 may be actuated (e.g., opened and/or closed) electronically by module controller 372 and/or imaging system controller 312, for example. Shutters 349 and 389 may be coupled to/supported by housing 348, for example, and housing 348 may be adapted to protect system 300 from environmental conditions associated with space or atmospheric flight, and/or other outdoor environmental conditions, such as fixed or articulated mounting on a terrestrial vehicle, for example. In other embodiments, housing 348 may be adapted for handheld use.

In various embodiments, IR camera module 380 may be implemented as a LWIR camera that is boresighted with UV camera module 370 implemented as a SWUV camera. Both camera modules 370 and 380 can have similar fields of view, and both camera modules are coupled to housing 348 that may be mounted onto a PTU to enable the monitoring of a larger environmental field (or region of interest). In some aspects, the monitoring can include scanning of up to and including 360 angular degrees through the use of a scan list that is defined as a preset angular path for the PTU. Both camera modules 370 and 380 can be electronically triggered so that the camera modules 370 and 380 can produce frame-synchronized video streams that can then be overlaid with visual information by a graphics processor that is, or includes at least a portion of, the module controller 372, which can compare the two images (e.g., LWIR image and SWUV image) on a pixel-by-pixel basis. If a thermal object such as a hot spot in the LWIR image spatially corresponds to a bright spot in the SWUV image, the system, with at least the module controller 372, can evaluate a calculated ratio of radiant intensity (measured in terms of watts per steradian) in the two spectral bands for the region of interest to determine whether the calculated ratio matches a predetermined radiant intensity ratio of an open flame.

In various embodiments, UV camera module 370 is implemented as a SWUV sensor that acts in concert with IR camera module 380 implemented as a thermal LWIR camera. In other embodiments, IR camera module 380 may be implemented as a SWIR camera, a NIR camera or visible camera. Having the camera modules 370 and 380 acting in concert to image a scene can be efficacious at excluding false alarms, because a thermal anomaly such as a flame can generate the correct proportions of radiation in the various spectral bands. The radiation intensity ratio in the two spectral bands (e.g., LWIR band, SWUV band) can be characterized in advance (or offline) through radiometric experiments on different flames with known fuels and oxidizers. These radiometric experiments can also be performed for the same flame composition at different sizes to determine different ranges of the radiant intensity ratio for different flame types. These radiometric experiments can also be performed at different times in the diurnal cycle and in different weather conditions. In some aspects, the ability to characterize flames by a ratio of radiant intensity in the LWIR band to the SWUV band may not be feasible for some types of flames. For example, the radiant intensity ratio may be affected by environmental conditions such as wind, or by the presence of gases such as oxygen or the composition of combustible materials.

In various embodiments, multispectral imaging sensor payload 140, with module controller 372, can be adapted to trigger an alert (or some type of notification) when two preset conditions are met. For example, the first condition may include an occurrence of a hot spot detected in the field of view of the LWIR camera (e.g., IR camera module 380) that has a temperature associated with an intensity value of a pixel of the LWIR image, the composite image, or a combination thereof, which exceeds a preset threshold (e.g., 300° F.). The second condition may include an occurrence of SWUV radiation detected within the field of view of the SWUV camera (e.g., UV camera module 370) that has a temperature associated with an intensity value of a pixel of the SWUV image, the composite image, or a combination thereof, which exceeds a preset radiant intensity threshold. In some examples, PCB 375 feeds an output trigger signal with the driver circuit to a digital input interface of module controller 372 (or imaging system controller 312) with an audible alarm condition set on the input including a pulsed alarm on a Readout Interface (ROI) with a temperature threshold setting. When a flame is presented to the two sensors (e.g., LWIR sensor, SWUV sensor), the image rendered for display on display 333 (e.g., IR monitor) includes visual and audible indicators (e.g., flashes and beeps).

In some examples, the output of FPA 374 implemented by the solar-blind shortwave ultraviolet light imaging sensor may not be inherently radiometric in the sense that a pulse height of the output is constant with in-band irradiance, however, the pulse rate of the output can be proportional to the incident irradiance up to a maximum pulse rate of 20 Hz by the output of PCB 375 with FPA 374. In one or more embodiments, PCB 375 may be implemented with a metal-filled heatsink board and a spectrally pure 5 mW 260 nm light-emitting diode (LED) mounted on the metal-filled heatsink board, in which PCB 375 with FPA 374 can analyze the relationship between the pulse height and pulse rate of the output with visual indications to a user by the LED. The LED can be driven by a laser diode driver implemented within PCB 375. The LED irradiance at a predetermined distance can be measured using a calibrated UV-enhanced silicon detector and an optical power meter coupled to, or implemented within, multispectral imaging sensor payload 140. In one or more embodiments, the LED has a power pattern that is substantially uniform to simultaneously irradiate the active area of FPA 374 and a co-located silicon detector with a corresponding irradiance. In an embodiment, the pulse rate of FPA 374 through PCB 375 can be measured along with the LED irradiance in terms of watts per square centimeters. PCB 375 coupled with FPA 374 can output a maximum pulse rate of about 20 Hz in some embodiments, or a wider range of pulse rates beyond 20 Hz in other embodiments.

In an embodiment, PCB 375 coupled with FPA 374 can operate over a wider range of SWUV irradiance such that imaging module 142, with UV camera module 370 and IR camera module 380, can measure the radiant intensity of a flame in both the LWIR and SWUV bands simultaneously. In this respect, module controller 372, for example, can determine if there is a repeatable radiant intensity ratio from the measured radiant intensity values in both spectral bands. As discussed before, this repeatable radiant intensity ratio can be used as an alarm trigger condition that corresponds to the second condition. The predetermined radiant intensity ratios may correspond to flames of different sizes and/or distances from the SWUV sensor, and the flames can have a variety of chemical precursors that correspond to the type of flames commonly encountered in commercial applications for flame sensors, such as the flames that occur in automotive recycling facilities.

In some embodiments, a silicon-based sensor that is filtered to detect SWUV radiation can be radiometrically calibrated for flame UV characterization. The radiometrically calibrated silicon-based sensor can measure the SWUV radiant intensity of open flames. In an embodiment, the silicon-based sensor may be implemented with a bandpass filter that can reject out-of-band radiation at a level required to accurately measure the UV emission of a flame. A flame may have about 6 to 8 orders of magnitude more radiant intensity in the NIR and visible bands relative to the SWUV band. In another embodiment, the radiometrically calibrated sensor may be implemented by an inherently solar-blind wide bandgap detector imaging sensor.

In various embodiments, IR camera module 380 may be implemented by an uncooled microbolometer camera and UV camera module 370 may be implemented by a SWUV spot meter that are adapted to detect flames. In an embodiment, the uncooled microbolometer camera and the SWUV spot meter are coupled to a fiber-couple SWIR spectrometer that is adapted to sample a spectrum of the flame in a plural number of equidistant or quasi-distant spaced SWIR spectral channels. The spectrum of the flame can be compared to a library of known flame spectra using a trained computational neural network, or spectral unmixing techniques such as principal component analysis. In some implementations, multispectral imaging sensor payload 140 implemented with the uncooled microbolometer camera and the SWUV spot meter can identify the flame composition and cause deployment of a correct type of flame retardant agent from a reservoir housed within systems 100 or 300, perhaps through the action of platform 110 implemented as a ground-based robot or an unmanned aerial system.

In some embodiments, module controller 372 may be implemented with machine-learning algorithms (e.g., supervised or unsupervised neural networks, convolutional neural networks, or the like) that evaluate the temporal and spatial signature of a hot spot (or flame), for example, as detected by IR camera module 380 to advantageously provide additional gating that further reduces detections of false alarms. In some examples, thermal events such as fires have an associated temporal signature with a low-frequency oscillatory pattern (e.g., flickering). This distinct oscillatory pattern occurs as oxygen in the immediate vicinity of the fire is consumed, leading to a momentary reduction in flame intensity. This reduction in flame intensity can cause an inrush of oxygen that causes an increase in the flame intensity, and then the cycle is repeated. However, certain environmental conditions such as windy conditions can lead to a disparate temporal signature of a flame by continuously replenishing the oxygen and sweeping away the non-flammable combustion products. In some embodiments, the machine-learning algorithms can be trained to detect a flame with a more stable radiance time profile (e.g., the oscillatory pattern of the flame is significantly reduced or non-existent). In one or more embodiments, the machine-learning algorithms can be trained to evaluate the infrared signature of a fire with an increasing temperature and size of the fire. In some examples, the exhaust stack on heavy machinery can exhibit an increasing temperature, particularly when the diesel engine transitions into a regeneration mode. In the regeneration mode, the temperature of the exhaust system is increased by way of additional fuel injection to burn off any carbon soot that accumulates in the diesel particulate filter. As such, the machine-learning algorithms can be trained to distinguish this type of thermal anomaly from an actual growing fire.

As shown in FIG. 3, multispectral imaging sensor payload 140 may be implemented with a variety of other components adapted to facilitate operation of multispectral imaging sensor payload 140, including capturing multispectral images of scene 302, generating composite images of scene 302, classifying object 304 (e.g., as open flame or not open flame, corona discharge or not corona discharge, and/or likelihood thereof), and/or reporting such sensor data to other elements of system 100 as described herein. In some embodiments, system 300 may report sensor data by aggregating sensor data over time (e.g., multiple frames) to provide a time-duration-based reliability of such classifications determined by system 300, and then transmitting the sensor data to other elements of system 100. In other embodiments, system 300 may report sensor data by energizing an LED indicator and/or transmitting an alert or notification signal to a component (e.g., an alarm, or an electrical switch or relay) of systems 300 or 100.

Each of imaging sensor controller 312, memory 146, user interface 332, communication module 144, display 333, and other modules 152, if optionally included in multispectral imaging sensor payload 140, may be coupled to PCB 375 or to housing 348, for example, depending on a desired application and/or overall size of multispectral imaging sensor payload 140 and/or imaging module 142. In other embodiments, any one or group of such components may be implemented externally to multispectral imaging sensor payload 140, for example, and/or in a distributed or grouped manner (e.g., multiple imaging system controllers 312 operating multispectral imaging sensor payload 140, or multiple multispectral imaging systems 140 operated by a single imaging system controller 312).

Imaging system controller 312 may be implemented as any appropriate processing device (e.g., microcontroller, processor, application specific integrated circuit (ASIC), field programmable gate array (FPGA), or other logic device) that may be used by system 300 to execute appropriate instructions, such as software instructions and/or signal processing operations for, for example, capturing multispectral images of scene 302 using imaging module 142, generating composite pixel data associated with such multispectral images, classifying pixels and/or elements of scene 302 in such images (e.g., using a CNN implemented within imaging system controller 312), and/or reporting such sensor data/information to other elements of multispectral imaging system 100 or 300. Further, imaging system controller 312 may be implemented with various signal processing devices, such as analog to digital converters (ADCs), trigger inputs, timing circuitry, and other signal or sensor processing devices as described herein.

In various embodiments, at least some portion or some functionality of imaging system controller 312 may be part of or implemented with other existing controllers or logic devices of separate systems, such as a server, a personal electronic device (e.g., a mobile phone, smartphone, tablet device, laptop computer, desktop computer), and/or any other device that may be used to process, report, or act on multispectral images captured by system 300. In other embodiments, imaging system controller 312 may be adapted to interface and communicate with various external controllers or logic devices and associated components and/or perform various operations in a distributed manner.

In general, imaging system controller 312 may be adapted to interface and communicate with other components of system 300 to perform the methods and processes described herein. In one embodiment, imaging system controller 312 may be adapted to use communication module 144 to report multispectral imagery and/or pixel/object classifications to display 333 and render and/or display such information or an alert notification, for example, or render and/or display an image of a classification map corresponding to scene 302. In another embodiment, imaging system controller 312 may be adapted to use communication module 144 to establish a wired or wireless communication link with a remote reporting system, for example, and report such sensor information.

Memory 146 is typically in communication with at least imaging system controller 312 and may include one or more memory devices (e.g., memory components) to store information, including image data, calibration data, other types of sensor data, and/or software instructions. Such memory devices may include various types of volatile and non-volatile information storage devices, such as RAM (Random Access Memory), ROM (Read-Only Memory), EEPROM (Electrically-Erasable Read-Only Memory), flash memory, a disk drive, and/or other types of memory. In one embodiment, memory 146 may include a portable memory device that can be removed from system 300 and used to convey stored data to other systems for further processing and inspection.

Communication module 144 may be configured to facilitate communication and interfacing between various components of system 300 (e.g., between imaging system controller 312 and memory 146 and/or display 333) and/or various external devices, such as a wireless access point, a personal electronic device, a server, and/or other detectors. For example, components such as user interface 332 and display 333 may transmit and receive data to and from imaging system controller 312 through communication module 144, which may be adapted to manage wired and/or wireless communication links between the various components. As such, communication module 144 may support various interfaces, protocols, and standards for local system networking, such as the controller area network (CAN) bus, the local interconnect network (LIN) bus, the media-oriented systems transport (MOST) network, or the ISO 11738 (or ISO bus) standard.

In some embodiments, imaging system controller 312 may be adapted to communicate, via communication module 144, with a remote user interface, a notification system, or other detection systems to, for example, aggregate reports from multiple systems or sensors and/or implement a particular detection and/or notification method. As such, communication module 144 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), a mobile cellular component, a wireless satellite component, or other appropriate wireless communication components. Communication module 144 may also be configured to interface with a wired network and/or device via a wired communication component, such as an Ethernet interface.

If present, user interface 332 provides for user interaction with multispectral imaging sensor payload 140 and may include one or more buttons, indicators (e.g., LEDs), keyboards, trackballs, knobs, joysticks, displays (e.g., a liquid crystal display, a touch-screen display), and/or other type of user interface adapted to accept user input and/or provide user feedback. In one embodiment, user interface 332 may include a power button, a vibration motor, an LED to indicate a maneuvering obstruction, and/or a speaker to provide an audible indication of a maneuvering obstruction (e.g., visible, tactile, and/or audible indicators). In various embodiments, user interface 332 may be used to input a variety of system configuration settings, such as integration time parameters, machine-learning algorithm selections, and/or other configuration settings, as described herein. In some embodiments, user interface 332 may be used to view one or more reports, graphs, and/or other image data captured by system 300 and/or processed according to the various operations described herein.

If present, display 333 may be configured to present, indicate, or otherwise convey alerts, notifications, and/or other reports of image data and/or object or pixel classifications (e.g., generated by imaging system controller 312). Display 333 may be implemented with an electronic display screen, such as a liquid crystal display (LCD), a cathode ray tube (CRT), or various other types of generally known video displays and monitors, including touch-sensitive displays. Display 333 may be suitable for presenting image data, graphs, video, reports, or other information as described herein.

Other modules 152 may include a fiber-couple SWIR spectrometer, a temperature sensor/probe (e.g., a thermocouple, an infrared thermometer), an LED or laser diode, an ambient light sensor, a voltage regulator and/or filter, a variable voltage source, and/or other types of devices that can be used to facilitate operation of multispectral imaging sensor payload 140, as described herein. In some embodiments, other modules 152 may include a GNSS, accelerometer, compass, and/or other orientation sensor capable of sensing a position and/or orientation of multispectral imaging sensor payload 140. Other modules 152 may additionally include a power module implemented as a battery, a power adapter, a charging circuit, a power interface, a power monitor, and/or other type of power supply providing a mobile power source.

In accordance with embodiments described herein, multispectral imaging systems may benefit from a variety of multispectral imaging and visualization techniques configured to improve the operational flexibility, reliability, and accuracy of such systems. In particular, embodiments may be configured to provide various display views, including augmented reality views based on imagery provided by multispectral imaging sensor payload 140 and/or other imagers of system 100, allowing a user to access and monitor such features and capabilities, for example, and may be implemented according to various processes and/or control loops configured to ease operator assessment, and qualitatively and quantitatively evaluate potential SWUV radiation sources more quickly and more reliably than conventional imaging systems.

In various embodiments, system 100 may be configured to visualize and characterize a detected thermal or electrical anomaly at a scene through use of multispectral imaging sensor payload 140 and other sensors mounted to mobile platform 110. In general, mobile platform 110 can relay sensor data to an onboard operator or remote operators at base station 130 and/or co-pilot station 230 where the sensor data can be processed or used to maneuver mobile platform 110. Such sensor data may also be rendered on a display to help visualize and characterize the detected thermal or electrical anomaly at a scene to assist a human operator with assessing the detection radiation and determining any next courses of action through the mobile platform 110.

Embodiments may overlay 2D or 3D sensor data onto geospatial maps or imagery as icons or colored highlights or blobs so that users can visualize the extent of a detected thermal or electrical anomaly at a scene. Embodiments may optionally include a second screen/additional base stations so that sensor data can be viewed/processed by a user other than a UAV/UGV pilot.

Figure 4:
FIG. 4 illustrates display views including imagery generated by a multispectral imaging system in accordance with embodiments of the subject technology.
Figure 4:
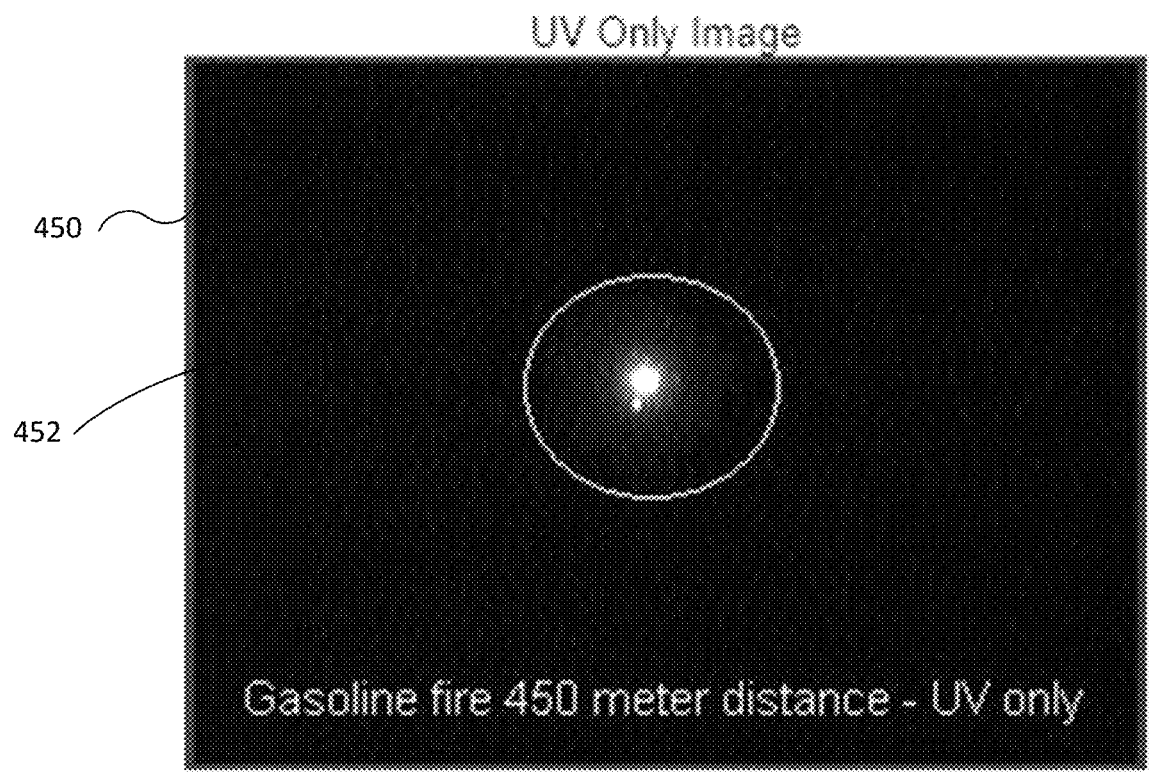

FIG. 4 illustrates display views including imagery generated by a multispectral imaging system in accordance with embodiments of the subject technology. In FIG. 4, display view 400 includes an image representation of a multispectral fire. In this example, a gasoline fire is imaged during the day by a type of multispectral imaging system that is located about 450 m from the fire. The aperture of the multispectral imaging system may be about 20 cm. The image representation in the display view 400 includes composite image data associated with a visible-light band image combined with a SWUV band image. In this respect, a bright spot object 410 associated with the SWUV band image is superimposed over the visible-light band image such that the bright spot object 410 may spatially correspond to a hot spot object (not shown) associated with the visible-light band image. Also, in FIG. 4, display view 450 includes image data associated only with the SWUV band. Given that the SWUV band is in the range of 200 nm to 300 nm, radiation intensity that falls within this range can be captured by a SWUV band sensor. As such, display view 450 depicts no discernable SWUV radiation signaling anywhere with the exclusion of the fire (e.g., 452).

Figure 5:
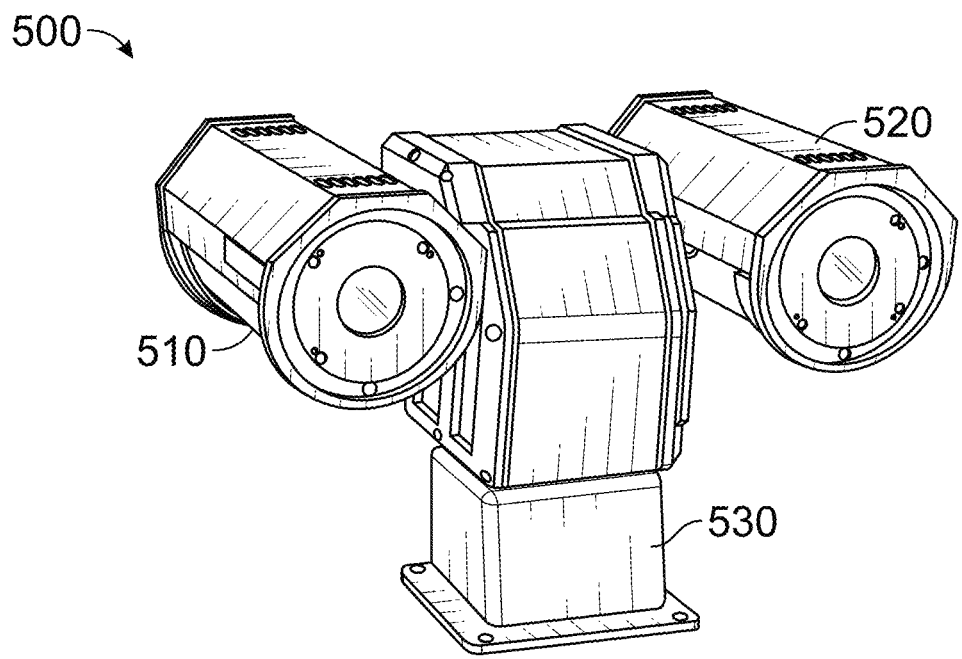
FIG. 5 illustrates a perspective view of an example of a dual-band camera system in accordance with an embodiment of the subject technology.

FIG. 5 illustrates a perspective view of an example of a dual-band camera system 500 in accordance with an embodiment of the subject technology. In various embodiments, the dual-band camera system 500 includes a LWIR camera 510 and a SWUV camera 520 in a two-headed geometry. In an embodiment, the SWUV camera 520 may be implemented as a SWUV spot meter. The LWIR camera 510 and the SWUV camera 520 may be implemented on a pan/tilt unit 530 with the SWUV spot meter boresighted to the optical axis of the LWIR camera 510. In some aspects, the SWUV spot meter is an imaging sensor implemented with a single pixel. The single pixel can be quite large relative to a camera pixel, which is useful for detection of very low SWUV irradiance. The LWIR camera 510 can provide imagery with a live image for context, and the SWUV camera 520 can detect SWUV radiation from flames with a relatively low false alarm rate. In other embodiments, the dual-band camera system 500 may be implemented with a visible band camera in addition to the LWIR camera 510 and the SWUV camera 520.

In an embodiment, the SWUV camera 520 may be implemented with optical elements that have a field of view that substantially corresponds to the field of view of the LWIR camera 510. The corresponding fields of view by both cameras 510 and 510 can reduce the sensitivity of the UV sensor implemented within the SWUV camera 520. Although this field of view correspondence may not adversely affect the performance of the dual-band camera system 500 for shorter standoff ranges, the irradiance from a thermal event such as flame of a given size may be measured higher the closer the detected flame is to the UV sensor. In some aspects, the angular position measurement within the field of view may be compensated for due, in part, to the field of view correspondence in order to minimize the occurrence of a false alarm detection when a hot spot detected by the thermal infrared camera (e.g., the LWIR camera 510) is not spatially correlated with the detection of a non-flame related SWUV source, such as a high-voltage electrical discharge or corona discharge, by the SWUV camera 520.

Figure 6:
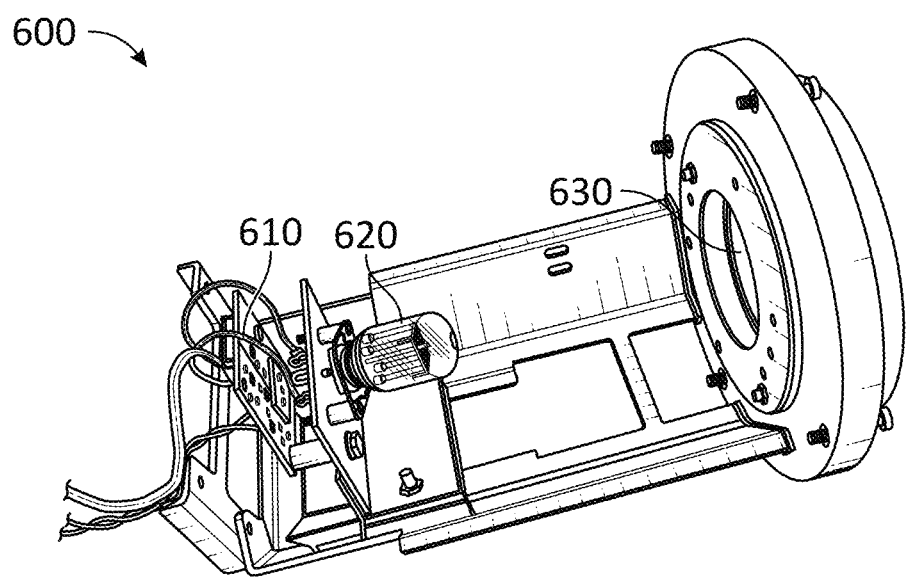
FIG. 6 illustrates a perspective view of an example of a spot meter assembly for a multispectral imaging system in accordance with embodiments of the subject technology.

FIG. 6 illustrates a perspective view of an example of a spot meter assembly 600 for a multispectral imaging system in accordance with embodiments of the subject technology. In various embodiments, the spot meter assembly 600 corresponds to, or includes at least a portion of, the SWUV camera 520 of FIG. 5. In various embodiments, the spot meter assembly 600 includes a driver circuit 610, a solar-blind shortwave ultraviolet light imaging sensor 620 and an ultraviolet light transmissive lens 630. The ultraviolet light transmissive lens 630 may be arranged laterally along an optical axis from the solar-blind shortwave ultraviolet light imaging sensor 620 by a predetermined focal length distance.

In one or more embodiments, the solar-blind shortwave ultraviolet light imaging sensor 620 may be implemented by a gas-filled tube containing an anode and a photocathode, in which the photocathode is arranged at near physical proximity from the anode within the gas-filled tube. The gas-filled tube may be coupled to, or mounted to, a socket in the spot meter assembly 600. In an embodiment, the spot meter assembly 600 is shock mounted to a camera apparatus such as the dual-band camera system 500 of FIG. 5 to prevent the gas-filled tube from de-coupling from the socket in the spot meter assembly 600.

In one or more embodiments, the solar-blind shortwave ultraviolet light imaging sensor 620 is implemented with a 10 mm by 12 mm active light-sensing area. Solar-blind shortwave ultraviolet light imaging sensor 620 can be mounted behind the ultraviolet light transmissive lens 630 (or interposed between driver circuit 610 and ultraviolet light transmissive lens 630). In an embodiment, ultraviolet light transmissive lens 630 is implemented by one or more optical elements made of an optical material sensitive to the SWUV band such as fused silica from highly purified quartz. In operation, the ultraviolet light transmissive lens 630 is adapted to focus a SWUV source onto the active light-sensing area of the solar-blind shortwave ultraviolet light imaging sensor 620, narrowing the field of view of the solar-blind shortwave ultraviolet light imaging sensor 620 to have it operate as a spot meter as opposed to a wide area detector, and simultaneously enhancing the sensitivity by increasing the effective sensing area of the solar-blind shortwave ultraviolet light imaging sensor 620.

In an embodiment, driver circuit 610 is, or is coupled to, or includes at least a portion of, an electronic pulse counter circuit that is adapted to convert a pulse count rate of the output of solar-blind shortwave ultraviolet light imaging sensor 620 into an irradiance value in digital format. This digital irradiance value can be converted to engineering units such as photons per seconds per square centimeters. In some examples, the linear range of the solar-blind shortwave ultraviolet light imaging sensor 620 may be limited because driver circuit 610 may be adapted to output up to a maximum pulse rate of about 20 pulses per second. At higher irradiance levels, the output pulse rate from driver circuit 610 may not increase. Nevertheless, the linearity of solar-blind shortwave ultraviolet light imaging sensor 620 can be measured using a predetermined irradiance value from a narrowband SWUV LED (not shown) that can be driven by a current source. In one or more embodiments, spot meter assembly 600 may be implemented with a calibrated silicon-based detector that is connected to an optical power meter (not shown), which can be used to measure the irradiance level at a spatial position of the solar-blind shortwave ultraviolet light imaging sensor 620 and the pulse rate output of the solar-blind shortwave ultraviolet light imaging sensor 620 can be measured at a series of different irradiance levels by the optical power meter.

Figure 7B:
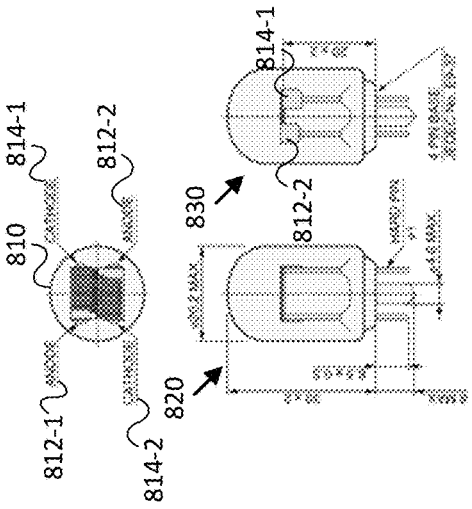
FIG. 7B conceptually illustrates a schematic diagram of a hemispherical lens for a multispectral imaging system in accordance with embodiments of the subject technology.
Figure 7A:
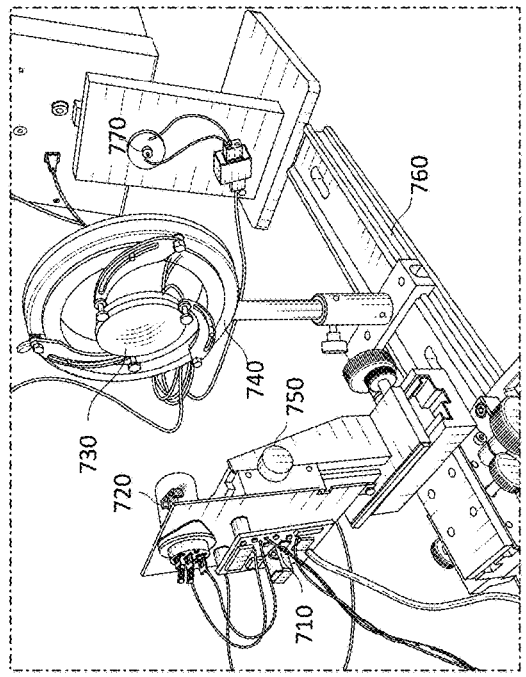
FIG. 7A illustrates a perspective view of a test rail assembly including a spot meter assembly for a multispectral imaging system in accordance with embodiments of the subject technology.

FIG. 7A illustrates a perspective view of a test rail assembly 700 including a spot meter assembly for a multispectral imaging system in accordance with embodiments of the subject technology. Test rail assembly 700 includes a driver circuit 710, a solar-blind shortwave ultraviolet light imaging sensor 720, an ultraviolet light transmissive lens 730, an optical rail lens mount 740, a two-dimensional positioner 750 and a rail assembly 760. The solar-blind shortwave ultraviolet light imaging sensor 720 may be aligned with ultraviolet light transmissive lens 730 on the rail assembly 760 pointed towards LED 770 that serves as a SWUV source (e.g., radiation being emitted at about 260 nm).

The ultraviolet light transmissive lens 730 can be used to test both beam forming and irradiance enhancements. In an embodiment, ultraviolet light transmissive lens 730 may be implemented by a fused silica condensing lens with a 2-inch diameter (or about 50 mm) and a 100 mm focal length. The ultraviolet light transmissive lens 730 can be mounted onto optical rail lens mount 740 and the solar-blind shortwave ultraviolet light imaging sensor 720 can be positioned at the focus using the two-dimensional positioner 750 for X-Y alignment.

In an embodiment, ultraviolet light transmissive lens 730 having the 10 mm by 11 mm active area with a 100 mm focal length can produce a field of view of about 5.7 degrees by 6.3 degrees. If the 100 mm focal length lens has a 50 mm diameter clear aperture, the aperture area is about 19.63 squared centimeter, which is about 20 times greater than the active area of the photocathode in the solar-blind shortwave ultraviolet light imaging sensor 720. As such, this factor of approximately 20 can represent the irradiance enhancement factor gained by using a 50 mm diameter transmissive lens. Given a source that is smaller than the field of view of the spot meter, there may be about 20 times more power delivered to the solar-blind shortwave ultraviolet light imaging sensor 720 from that source.

FIG. 7B conceptually illustrates a schematic diagram of a hemispherical lens 730 for a multispectral imaging system in accordance with embodiments of the subject technology. In one or more embodiments, hemispherical lens 730 may be implemented with a short focal length (depicted as "Focal Length") with aberrations that are irrelevant to a solar-blind shortwave ultraviolet light imaging sensor (e.g., 720). In some embodiments, hemispherical lens 730 may have a relatively low focal length per aperture number ("f/number"). In some aspects, the focal length of hemispherical lens 730 is comparable to its clear aperture.

In some embodiments, hemispherical lens 730 may be implemented as a focusing lens made of fused silica that is used to reduce a wide field of view while simultaneously enhancing the sensitivity of the solar-blind shortwave ultraviolet light imaging sensor by increasing the surface area of the collection aperture. In an embodiment, hemispherical lens 730 may be implemented by a spherical lens that is highly insensitive to aberrations. In this respect, the spatial resolution of the solar-blind shortwave ultraviolet light imaging sensor can be significantly low (or negligible). Because the solar-blind shortwave ultraviolet light imaging sensor can effectively be a single pixel, the operation of the solar-blind shortwave ultraviolet light imaging sensor may not be adversely impacted if the ray bundle optically coupling through hemispherical lens 730 is not substantially focused to a specified location on the active area of the solar-blind shortwave ultraviolet light imaging sensor.

In an embodiment, the photocathode surface area in the solar-blind shortwave ultraviolet light imaging sensor is about 10 mm by 11 mm, or 110 squared millimeters. As described in Table 1, a transmissive lens with a lens diameter of about 50.8 mm and a lens focal length of about 100 mm can produce a field of view of about 6×6 degrees. In an embodiment, if a transmissive lens having a 100 mm focal length has a clear aperture diameter of about 47 mm, then the aperture area is about 1700 squared millimeters, which is about 16 times greater than the active area of the photocathode in the solar-blind shortwave ultraviolet light imaging sensor. This factor of 16 can represent the irradiance enhancement factor gained by using a 50 mm lens diameter. Given a source that is smaller than the field of view of the spot meter, there may be about 16 times more power delivered to the solar-blind shortwave ultraviolet light imaging sensor from that source.

Table 1 also describes an alternative transmissive lens design option, where the lens diameter is about 25.4 mm (or 1-inch diameter) and a lens focal length of about 35.1 mm to produce a field of view of about 16×18 degrees. In an embodiment, if a transmissive lens having a 35 mm focal length has a clear aperture diameter of about 22 mm, then the aperture area is about 380 squared millimeters, which is about 6 times greater than the active area of the photocathode in the solar-blind shortwave ultraviolet light imaging sensor. This factor of 6 can also represent the irradiance enhancement factor gained by using a 25 mm lens diameter. In cases where multispectral imaging is used to monitor electrical power equipment, the wider field of view of 16×18 degrees can better facilitate scans of larger areas on transmission lines or high-voltage switchgear.

TABLE 1

| Spot meter Design Tradeoffs | | |
|---|---|---|
| Lens Diameter | 25.4 mm | 50.8 mm |
| Lens Focal Length | 35.1 mm | 100 mm |
| Irradiance Enhancement | ~6 | ~16 |
| Field of View | ~16 × 18 degrees | ~6 × 6 degrees |

Figure 8B:
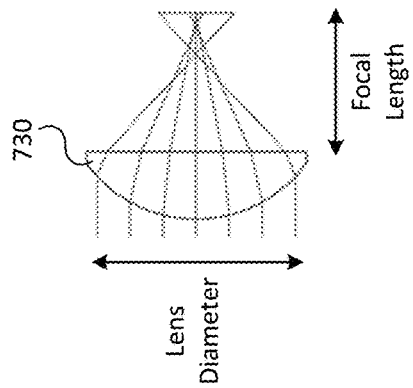
FIG. 8B illustrates a schematic diagram of the shortwave ultraviolet light sensor of FIG. 8A in accordance with embodiments of the subject technology.
Figure 8A:
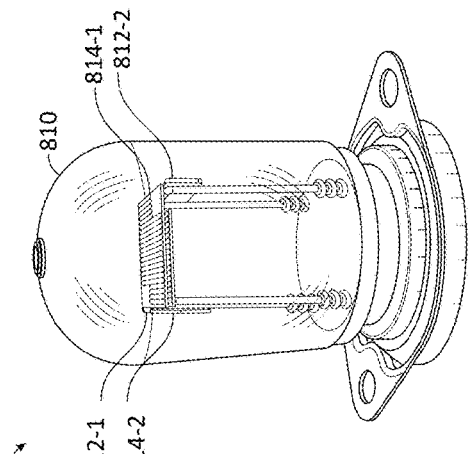
FIG. 8A illustrates an example of a shortwave ultraviolet light sensor for a spot meter assembly in accordance with embodiments of the subject technology.

FIG. 8A illustrates an example of a shortwave ultraviolet light sensor 800 for a spot meter assembly in accordance with embodiments of the subject technology. In various embodiments, shortwave ultraviolet light sensor 800 may be implemented by a gas-filled tube 810 with an anode 812-1, 812-2 and photocathode 814-1, 814-2 in close physical proximity. In an embodiment, the sensitive area of the shortwave ultraviolet light sensor 800 is a square mesh-like grid of metallic nickel (the anode 812-1, 812-2). The active area of the shortwave ultraviolet light sensor 800 may be about 10 mm by 12 mm. The square mesh-like grid can allow UV radiation to pass through and penetrate the photocathode 814-1, 814-2. For example, the electrons are accelerated towards the anode 812-1, 812-2 by a strong electric field generated by a DC bias supply of about 300-400 volts and produce both a cascade of positive gas ions that mobilize towards the photocathode 814-1, 814-2. In this respect, a cascade of electrons can mobilize towards the anode 812-1, 812-2. These actions may produce current pulses with a 10-microsecond characteristic pulse duration.

FIG. 8B illustrates a schematic diagram of the shortwave ultraviolet light sensor of FIG. 8A in accordance with embodiments of the subject technology. In FIG. 8B, a top view 810 of shortwave ultraviolet light sensor 800 is illustrated with anode and cathode terminals coupled to the square mesh-like grid, depicted as "Anode" and "Cathode," respectively. A first side view 820 illustrates the square mesh-like grid, and a second side view 830 illustrates the anode 812-2 and cathode 814-1 terminals coupled to the square mesh-like grid.

Figure 9:
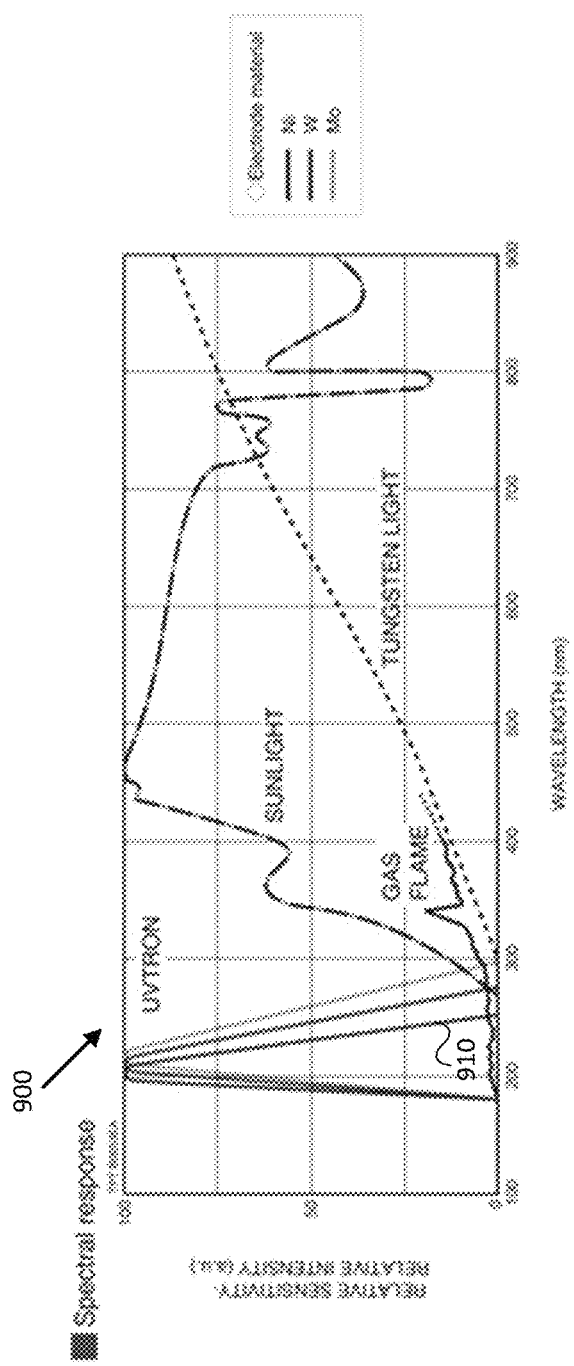
FIG. 9 illustrates a plot of spectral response curves for a shortwave ultraviolet light sensor in accordance with embodiments of the subject technology.

FIG. 9 illustrates a plot 900 of spectral response curves for a shortwave ultraviolet light sensor in accordance with embodiments of the subject technology. Plot 900 depicts a spectral response curve 910 for a nickel photocathode. When radiation with photon energy measured above a preset threshold of about 5.2 eV strikes the nickel photocathode, electrons are released from the cathode surface due to the photoelectric effect. The nickel photocathode material may have a work function energy of around 5.2 eV, which causes photons with energies at or above this energy level to liberate electrons from the cathode surface. The wavelength of the light wave that corresponds to this photon energy is about 238 nm as denoted by the spectral response curve 910. In an embodiment, the device cutoff of the nickel photocathode is at a wavelength of about 260 nm, thus making it inherently solar blind and eliminating the need for a UV bandpass filter.

Figure 10:
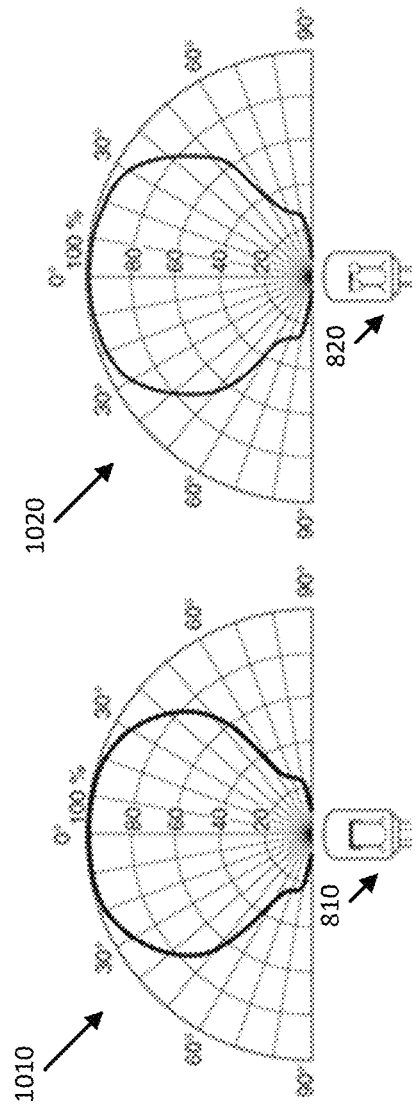
FIG. 10 illustrates plots of angular response functions for a shortwave ultraviolet light sensor in accordance with embodiments of the subject technology.

FIG. 10 illustrates plots of angular response functions for a shortwave ultraviolet light sensor in accordance with embodiments of the subject technology. In various embodiments, angular response functions of a solar-blind shortwave ultraviolet light imaging sensor can be measured in two axes relative to the anode-cathode internal assembly of the solar-blind shortwave ultraviolet light imaging sensor. In FIG. 10, plots 1010 and 1020 illustrate the intrinsic field of view of the solar-blind shortwave ultraviolet light imaging sensor at about 100 degrees in both the horizontal and vertical angular axes, respectively, considering the 50% points of sensitivity to be at about +/−50 degrees.

Figure 11:
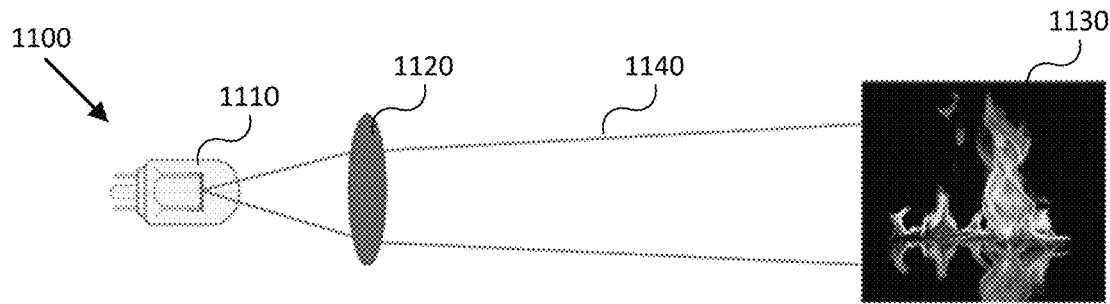
FIG. 11 illustrates a notional schematic of a shortwave ultraviolet light sensor and lens assembly imaging a flame in accordance with embodiments of the subject technology.

FIG. 11 illustrates a notional schematic of a shortwave ultraviolet light sensor and lens assembly 1100 imaging a flame in accordance with embodiments of the subject technology. In various embodiments, shortwave ultraviolet light sensor and lens assembly 1100 is implemented by an arrangement of a solar-blind shortwave ultraviolet light imaging sensor 1110 and an ultraviolet light transmissive lens 1120 arranged along an optical axis of the solar-blind shortwave ultraviolet light imaging sensor 1110. The ultraviolet light transmissive lens 1120 may be implemented by one or more fused silica lens and is adapted to focus radiation 1140 from a region of interest in a scene 1130 (e.g. a flame) onto the active area of the solar-blind shortwave ultraviolet light imaging sensor 1110. The field of view angle may be the dimension of the active area of the solar-blind shortwave ultraviolet light imaging sensor 1110 divided by the effective focal length of the ultraviolet light transmissive lens 1120. The ultraviolet light transmissive lens 1120 may not be achromatic, since the field of view size can be on the order of millimeters across the active area, compared to field of view sizes required for a UV staring array with significantly smaller pixel detectors. In this respect, the relatively large detector area of solar-blind shortwave ultraviolet light imaging sensor 1110 can make shortwave ultraviolet light sensor and lens assembly 1100 significantly less sensitive to aberrations in the ultraviolet light transmissive lens 1120.

Figure 12:
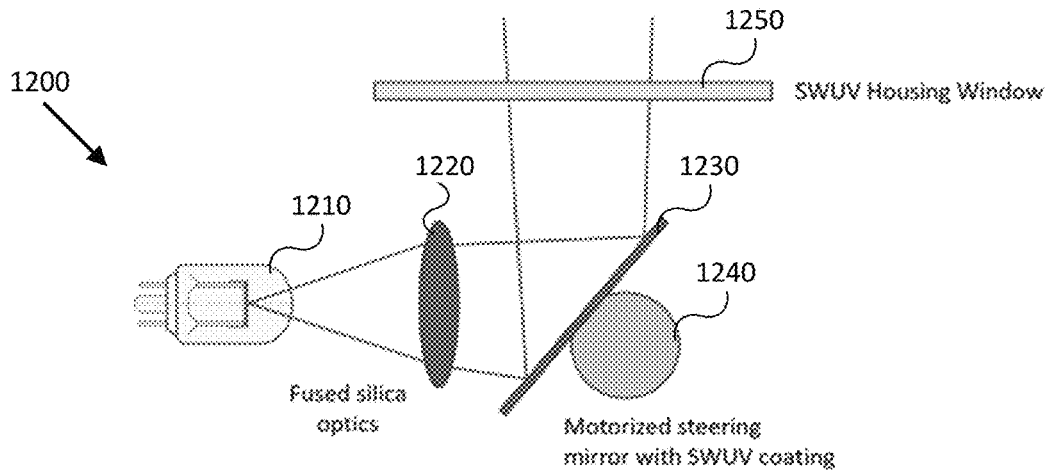
FIG. 12 illustrates a notional schematic of a shortwave ultraviolet light sensor and lens assembly with a steering mirror arrangement in accordance with embodiments of the subject technology.

FIG. 12 illustrates a notional schematic of a shortwave ultraviolet light sensor and lens assembly 1200 with a steering mirror arrangement in accordance with embodiments of the subject technology. In various embodiments, shortwave ultraviolet light sensor and lens assembly 1200 is implemented by an arrangement of a solar-blind shortwave ultraviolet light imaging sensor 1110 and an ultraviolet light transmissive lens 1120 arranged along an optical axis of the solar-blind shortwave ultraviolet light imaging sensor 1110, including a steering mirror arrangement to scan the field of view of the shortwave ultraviolet light sensor and lens assembly 1200 over a larger region of interest. In an embodiment, the steering mirror arrangement is implemented by a mirror 1130 and a motorized rotation mechanism 1240 that is coupled to the mirror 1130.

In an embodiment, may be implemented with an environmental housing with a shortwave ultraviolet transmissive window 1250. The shortwave ultraviolet transmissive window 1250 may be formed of a fused silica with anti-reflection (AR) coating for the SWUV spectral band in the range of 200 nm to 275 nm. In operation, the mirror 1130 may be adjusted in position by the motorized rotation mechanism 1240 to optically interact with radiation received through the shortwave ultraviolet transmissive window 1250 by rotating the mirror 1130 by a predetermined angular distance to point toward the shortwave ultraviolet transmissive window 1250. This would enable the use of a fixed LWIR camera that can detect thermal sources in the LWIR band and mechanically control the shortwave ultraviolet light sensor and lens assembly 1200 to image the thermal source to positively detect any SWUV radiation from the same angular position in object space. The mirror 1130 and the motorized rotation mechanism 1240 may be arranged within the environmental housing. In an embodiment, the steering mirror arrangement is adapted to rotate continuously at a predetermined rate for scanning at least a portion of a scene through the shortwave ultraviolet transmissive window 1250 for shortwave ultraviolet sources. In another embodiment, the steering mirror arrangement is adapted to rotate in response to detection of a shortwave ultraviolet source within the at least the portion of the scene, which may be advantageous to extend the operational lifespan of the steering mirror arrangement.

Figure 13:
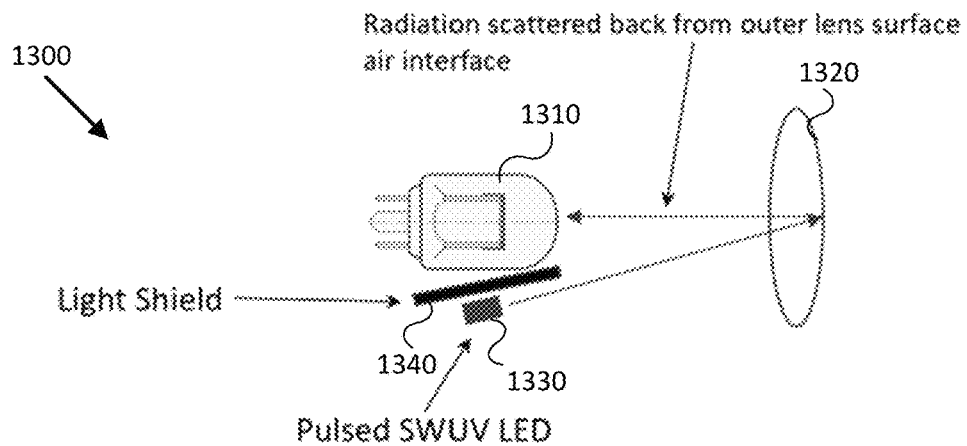
FIG. 13 illustrates a notional schematic of a solar-blind shortwave ultraviolet light imaging sensor and a pulsed light source in accordance with embodiments of the subject technology.

FIG. 13 illustrates a notional schematic of a sensing assembly 1300 having a solar-blind shortwave ultraviolet light imaging sensor 1310 and a pulsed light source 1330 in accordance with embodiments of the subject technology. In various embodiments, the sensing assembly 1300 may be implemented with solar-blind shortwave ultraviolet light imaging sensor 1310 and an ultraviolet light transmissive lens 1320 arranged along an optical axis of the solar-blind shortwave ultraviolet light imaging sensor 1310. As depicted in FIG. 13, sensing assembly 1300 also may be implemented by a pulsed shortwave ultraviolet light source 1330 that is adapted to radiate a pulse of radiation onto the ultraviolet light transmissive lens 1320. Additionally, sensing assembly 1300 may be implemented by a light shield 1340 interposed between the pulsed shortwave ultraviolet light source 1330 and the solar-blind shortwave ultraviolet light imaging sensor 1310 for isolating the solar-blind shortwave ultraviolet light imaging sensor 1310 from the pulse of radiation.

The ultraviolet light transmissive lens 1320 used to focus SWUV radiation onto the solar-blind shortwave ultraviolet light imaging sensor 1310 or other UV detector may be susceptible to contamination by oily films that can impinge the optical path between ultraviolet light transmissive lens 1320 and solar-blind shortwave ultraviolet light imaging sensor 1310 by blocking the SWUV radiation and reducing the sensitivity of the multispectral imaging system. This repeated contamination may require an electromechanical wiper system or regular cleaning of ultraviolet light transmissive lens 1320 when the multispectral imaging system is operated in a dirty industrial environment.

In this respect, a built-in self-test (BIST) technique to detect an oily film contamination on ultraviolet light transmissive lens 1320 may be implemented by pulsed shortwave ultraviolet light source 1330 mounted within an environmental housing (not shown) of sensing assembly 1300. The pulsed shortwave ultraviolet light source 1330 may be adapted to direct a pulse of radiation onto the ultraviolet light transmissive lens 1320 from the inside. In some aspects, at least a portion of the pulse of radiation is reflected from a surface of the ultraviolet light transmissive lens 1320 to the solar-blind shortwave ultraviolet light imaging sensor 1310 for detecting an oily film contamination on the surface of the ultraviolet light transmissive lens 1320. That reflection strength can be affected by the presence or absence of an oily film on the outer surface of ultraviolet light transmissive lens 1320, because the oily film can alter the index of refraction at the ultraviolet light transmissive lens 1320 (or air interface). A layer (or at least a portion thereof) of the oily film can reduce the strength of the reflection. In various embodiments, solar-blind shortwave ultraviolet light imaging sensor 1310 can be shielded by light shield 1340 for isolating the solar-blind shortwave ultraviolet light imaging sensor 1310 from the pulse of radiation so that the pulse of radiation does not directly enter the field of view of the solar-blind shortwave ultraviolet light imaging sensor 1310 such that only radiation reflected by the ultraviolet light transmissive lens 1320 can be detected.

Figure 14:
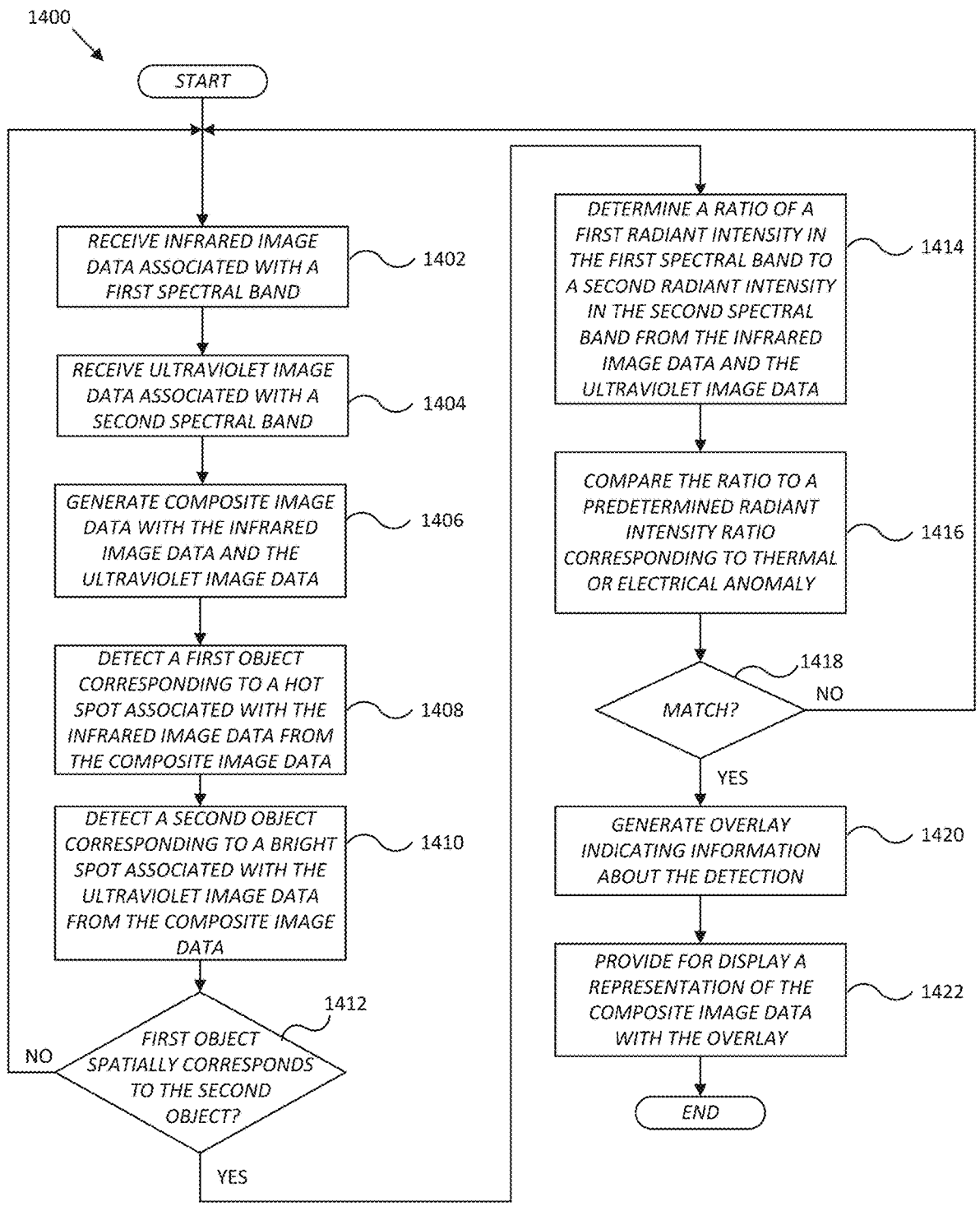
FIG. 14 illustrates a flow diagram of an example process with various operations to provide thermal sensing imaging with combined spectral bands using a multispectral imaging system in accordance with embodiments of the subject technology.

FIG. 14 illustrates a flow diagram of an example process with various operations to provide thermal sensing imaging with combined spectral bands using a multispectral imaging system in accordance with embodiments of the subject technology. In some embodiments, the operations of FIG. 14 may be implemented as software instructions executed by one or more logic devices or controllers associated with corresponding electronic devices, sensors, and/or structures depicted in FIGS. 1-3. More generally, the operations of FIG. 14 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 1400 may be performed in an order or arrangement different from the embodiments illustrated by FIG. 14. For example, in other embodiments, one or more blocks may be omitted from or added to each individual process. Furthermore, block inputs, block outputs, various sensor signals, sensor information, calibration parameters, and/or other operational parameters may be stored to one or more memories prior to moving to a following portion of a corresponding process. Although process 1400 is described with reference to systems described in FIGS. 1-3, process 1400 may be performed by other systems different from those systems and including a different selection of electronic devices, sensors, assemblies, mechanisms, platforms, and/or platform attributes.

Process 1400 of FIG. 14 may generally correspond to a method for detecting thermal combustion and/or electrical discharge using the multispectral imaging system 100. Process 1400 begins, at step 1402, where infrared image data associated with a first spectral band is received. Subsequently, at step 1404, ultraviolet image data associated with a second spectral band is received. For example, controllers 112, 312, and/or 372, communication modules 120, 144, and/or 134, user interface 132, and/or other elements of system 100 may be configured to receive multispectral image data corresponding to a thermal or electrical anomaly such as the infrared image data and the ultraviolet image data from multispectral imaging sensor payload 140 and/or imaging module 142 as mobile platform 110 maneuvers along a projected course (e.g., within scene 302).

Subsequently, at step 1406, composite image data may be generated with the infrared image data and the ultraviolet image data. For example, module controller 372 may be adapted to superimpose at least a portion of the ultraviolet image data containing a number of pixels that includes an image representation of the detected object in the SWUV band, over an image layer of the infrared image data.

Next, at step 1408, a first object corresponding to a hot spot associated with the infrared image data is detected from the composite image data. For example, module controller 372 may be adapted to analyze the infrared image data and determine that the intensity values at a number of pixels corresponds to a hot spot with a particular temperature, of which the pixel intensity values are determined to exceed a preset threshold value.

Subsequently, at step 1410, a second object corresponding to a bright spot associated with the ultraviolet image data is detected from the composite image data. For example, module controller 372 may be adapted to analyze the ultraviolet image data and determine that the intensity values at a number of pixels corresponds to a bright spot with a particular radiant intensity, of which the pixel intensity values are determined to exceed a preset radiant intensity threshold value.

Subsequently, at step 1412, the process 1400 proceeds with determining whether the first object spatially corresponds to the second object in the composite image data. For example, module controller 372 may be adapted to determine the pixel locations that correspond to each of the detected objects and compared them to one another to calculate the amount of overlap. In an embodiment, module controller 372 may determine whether the calculated amount of overlap exceeds a preset spatial correspondence threshold.

If the first object is determined to spatially correspond to the second object, the process 1400 proceeds to step 1414. Otherwise, process 1400 reverts back to the start immediately prior to step 1402.

Next, at step 1414, a ratio of a first radiant intensity in the first spectral band to a second radiant intensity in the second spectral band is calculated from the infrared image data and the ultraviolet image data. For example, module controller 372 may be adapted to measure an intensity value of a thermal object detected in the infrared image data and an intensity value of a spatially corresponding object detected in the ultraviolet image data to then calculate the ratio of the two measured intensity values.

Subsequently, at step 1416, the calculated ratio is compared to a library of predetermined radiant intensity ratios that correspond to respective types of thermal and electrical anomalies. For example, different types of flames with different flame compositions and/or different sizes, may be represented by corresponding ratios of radiant intensity.

At step 1418, if the calculated ratio is determined to match one of the predetermined radiant intensity ratios, the process 1400 proceeds to step 1420. Otherwise, process 1400 reverts back to the start immediately prior to step 1402.

Next, at step 1420, an overlay indicating information about the detection is generated. For example, module controller 372 may be adapted to extract information about each detected object in the respective spectral band and generate visual indicators that may enhance the scene with emphasis on and/or around the detected objects. In some examples, the overlay may include the relative strength of SWUV radiation signaling via graphical objects that pulse randomly within a rectangular box over the thermal infrared image.

Subsequently, at step 1422, a representation of the composite image data is provided for display with the overlay. For example, the image representation of the composite image data may be, or at least a part of, a video stream containing the overlay superimposed over the infrared imaging of the video stream. In an embodiment, the overlay contains an image representation of the SWUV radiation detection from the ultraviolet image data. In this respect, the displayed composite image data with the overlay can indicate both the detection of a SWUV radiation signal and the relative strength of the SWUV radiation signal. The displayed composite image data can include a rectangular box overlaid on the thermal infrared imagery that corresponds to the field of view of the UV camera module 370 implemented with an optical arrangement of a solar-blind shortwave ultraviolet light imaging sensor and an ultraviolet light transmissive lens. Within the rectangular box of the overlay, graphical elements in a predetermined color are displayed to illustrate the relative strength of the SWUV radiation signal. In an embodiment, the density of the graphical elements can increase as the intensity of the detected SWUV radiation signal increases. In this respect, the overlay information can facilitate the assessment of the UV anomaly by a UAS/UGV pilot or operator. At the conclusion of step 1422, the process 1400 can terminate.

By providing such systems and techniques for multispectral navigation, embodiments of the present disclosure substantially improve the operational performance and flexibility of manned and unmanned mobile platforms, including unmanned sensor platforms. Moreover, such systems and techniques may be used to increase the accuracy of detecting valid thermal and/or electrical anomalies by reducing the rate of false detections through occurrences of dual conditions in the LWIR and SWUV bands, beyond that achievable by conventional systems. As such, embodiments provide multispectral imaging systems with significantly increased operational convenience and performance.

Figure 15:
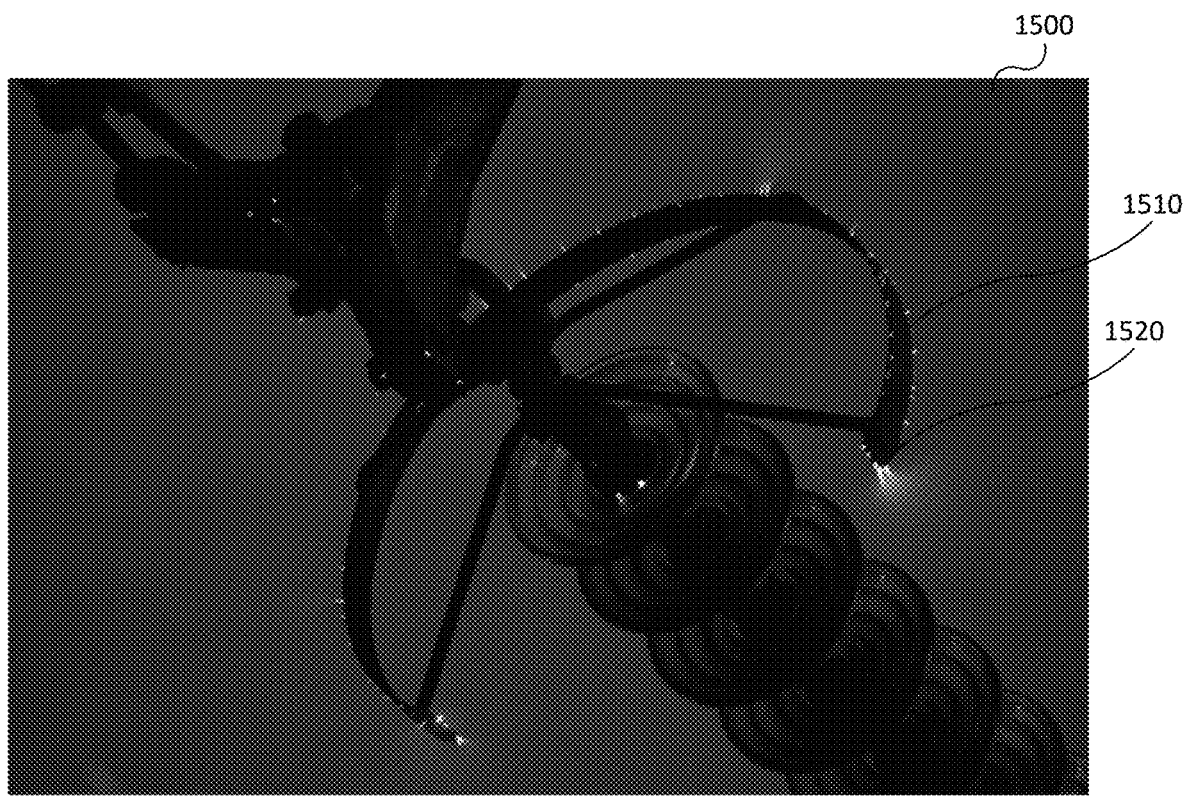
FIG. 15 illustrates an image representation of a corona discharge on a power line in accordance with embodiments of the subject technology.

FIG. 15 illustrates an image representation 1500 of a corona discharge on a power line in accordance with embodiments of the disclosure. In an embodiment, the image representation 1500 is, or includes at least a portion of, a long exposure photograph of a corona discharge 1520 detected on an insulator string 1510 of a high-voltage (e.g., 500-kV) overhead power line. In various embodiments, the image representation 1500 may be captured by a miniaturized multispectral imaging system that is coupled to, or mounted on, an unmanned aerial vehicle such as a drone, to inspect overhead power lines for electrical anomalies such as leakage current and high-voltage corona discharge.

The miniaturized multispectral imaging system for this type of implementation can incorporate an infrared sensor such as a LWIR detector and an ultraviolet sensor such as a SWUV detector integrated into a single small and lightweight housing. In an embodiment, the SWUV detector may be implemented by a small nickel-photocathode ultraviolet light sensor optically coupled to a 1-inch diameter ultraviolet focusing transmissive lens. In various embodiments, the SWUV detector is adapted to detect radiation within the SWUV band while excluding detection of other radiation beyond the SWUV band. In an embodiment, the nickel-photocathode ultraviolet light sensor may be implemented as a solar-blind sensor having a wavelength cutoff at about 275 nm. Due to the high energy of SWUV photons, the vast majority of artificial light sources do not produce SWUV radiation. Additionally, the nickel-photocathode ultraviolet light sensor may not detect radiation that corresponds to sunlight.

Because of extremely low levels of solar or man-made background radiation in SWUV band, the SWUV detector can be operated at a significantly high gain to detect at least low levels of SWUV radiation. The SWUV detector can be adapted to detect the SWUV radiation emitted by a high-voltage corona discharge (e.g., corona discharge 1520). Flames and fires also produce SWUV radiation, thus making this miniaturized multispectral imaging system for power line inspection can be a useful tool for the detection of fires and open flames with a low false alarm rate. Other thermal applications such as hot exhaust pipes and other high-temperature incandescent sources can trigger a flame detection threshold of the infrared sensor, however, these sources may not trigger the SWUV detector because, with a few exceptions, incandescent sources do not emit SWUV radiation.

The miniaturized multispectral imaging system can be deployed and flown by the unmanned aerial vehicle along an aerial trajectory proximate to power lines to inspect for two common phenomena correlated with electrical problems that can lead to catastrophic failures and wildfires. The LWIR detector can inspect for thermal hot spots on the power transmission equipment that can indicate a failing insulator or a loose connection. If a thermal hot spot is encountered, the operator of the unmanned aerial vehicle can evaluate the captured infrared imagery to determine the source. Concurrently, the SWUV sensor can inspect for corona discharges with radiation emitted in the SWUV band, which can occur on the surface of contaminated or cracked insulator bushings, as well as on transmission cables with broken wire strands. A corona discharge may be an early indication of possible damage that may evolve into a thermal anomaly, so there may also be a thermal hot spot as detected by the LWIR detector. A cracked bushing may initially generate a corona discharge, and then over time, the cracked bushing may become contaminated with moisture that can cause higher currents and heating, which can give rise to a thermal anomaly. Since corona discharge electric fields from a single electrode are inversely proportional to the radial curvature of the electrode, the increased sharpness of the bushing surface contamination or a broken wire strand may tend to produce a strong electric field enhancement. When the electric field exceeds 3 MV per meter at standard temperature and pressure, the air begins to break down electrically and long wispy discharges known as streamers can form in the ion cloud, as depicted around the corona discharge 1520 of the image representation 1500.

The emission spectrum of ionized air can be dominated by nitrogen spectral lines. Ionized nitrogen gas predominantly emits ultraviolet radiation, and some of that radiation is in the SWUV band, thus below 280 nm in wavelength. There can be negligible solar radiation in the SWUV band, so direct or reflected sunlight may not trigger the SWUV detector. There may be a limited number of other sources of shortwave radiation that may cause false indications of a corona discharge. Such sources may include arc welding and open flames.

Figure 16:
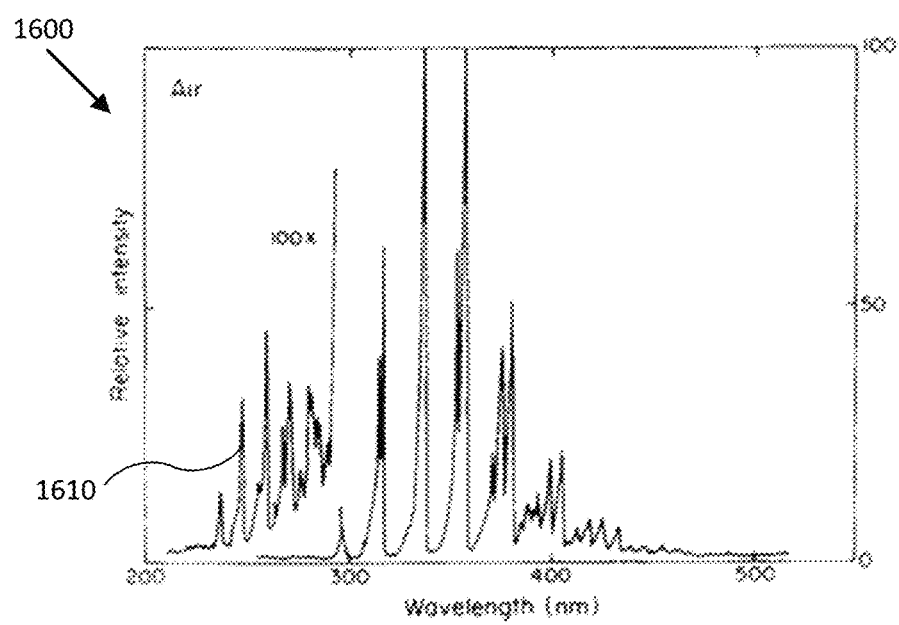
FIG. 16 illustrates a plot depicting spectral lines below an atmospheric ozone cutoff wavelength in accordance with embodiments of the subject technology.

FIG. 16 illustrates a plot 1600 depicting spectral lines below an atmospheric ozone cutoff wavelength in accordance with embodiments of the disclosure. Plot 1600 illustrates a spectral line curve 1610 present below the atmospheric ozone cutoff wavelength of about 280 nm. The lines in the spectral line curve 1610 that are present at or below the 275 nm wavelength can be detected by a SWUV detected implemented with a nickel photocathode sensor. As plot 1600 shows, the spectral emissions from corona discharges are about 100 times stronger in the LWUV band, which is in the range of 300 nm to 400 nm, as compared to the SWUV band range. However, there is substantial background solar radiation in the LWUV band, which makes daytime LWUV imaging of corona discharges practically unfeasible.

Figure 17:
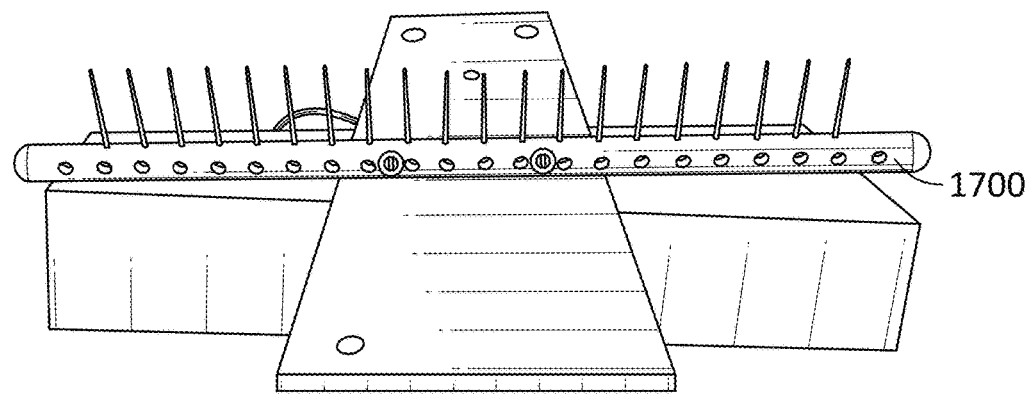
FIG. 17 illustrates an example of a positive electrode spray comb in accordance with embodiments of the subject technology.

FIG. 17 illustrates an example of a positive electrode spray comb 1700 in accordance with embodiments of the disclosure. The positive electrode spray comb 1700 may be adapted to produce radiation emission that corresponds to positive corona discharges. A test environment to confirm that SWUV sensors can detect SWUV radiation emitted by corona discharges, the positive electrode spray comb 1700 may be implemented by an array of needles (e.g., about 20 needles) arranged in a "spray comb" and are connected to an external power source (not shown). In some examples, the power source may supply 60 kV DC power. The positive electrode spray comb 1700 can be arranged in the field of view of a SWUV sensor having a photocathode and a focused transmissive lens optically aligned to the photocathode with a 100 mm focal length.

In various embodiments, a positive corona discharge can be generated by a high electric field surrounding the positive electrode spray comb 1700. The SWUV sensor can be adapted to successfully detect SWUV radiation from the positive electrode spray comb 1700 at a distance of at least 5 m. In an example, electrical discharges from an 80 kV Tesla coil device can be detected by the SWUV sensor at a range of about 15 m. In some examples, the corona discharges were measured to have a length of about 10 cm, which may be representative of actual corona anomalies in high-voltage switchgear.

Figure 18:
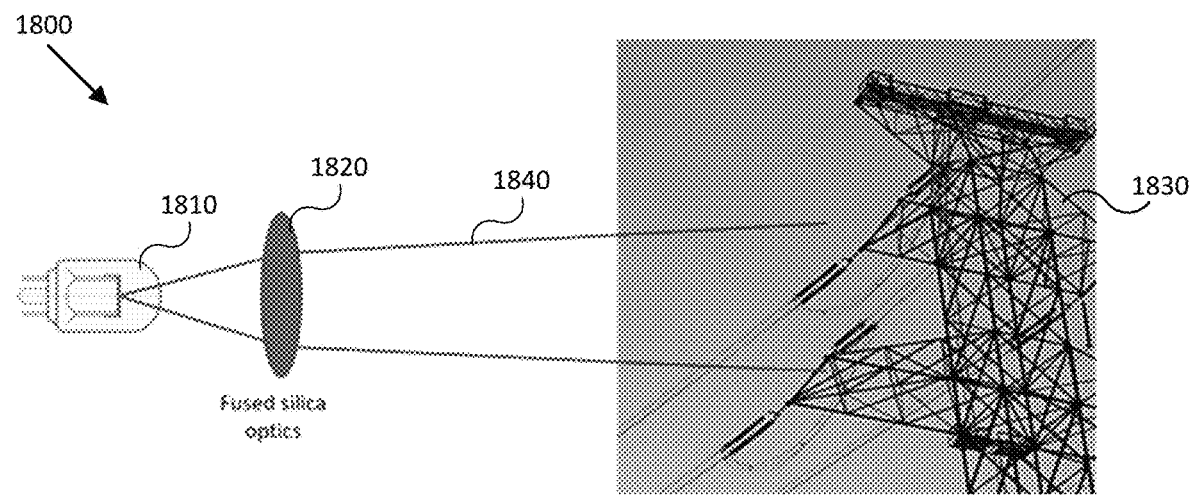
FIG. 18 illustrates a notional schematic of a shortwave ultraviolet light sensor and lens assembly scanning a transmission line in accordance with embodiments of the subject technology.

FIG. 18 illustrates a notional schematic of a shortwave ultraviolet light sensor and lens assembly 1800 scanning a transmission line in accordance with embodiments of the disclosure. In various embodiments, shortwave ultraviolet light sensor and lens assembly 1800 is implemented by an arrangement of a solar-blind shortwave ultraviolet light imaging sensor 1810 and an ultraviolet light transmissive lens 1820 arranged along an optical axis of the solar-blind shortwave ultraviolet light imaging sensor 1810. The ultraviolet light transmissive lens 1820 may be implemented by one or more fused silica lens and is adapted to focus radiation 1840 from a region of interest in a scene 1830 (e.g. high-voltage transmission lines) onto the active area of the solar-blind shortwave ultraviolet light imaging sensor 1810.

At a suitable altitude above or suitable distance to the side of a transmission line at the scene 1830, the field of view of the solar-blind shortwave ultraviolet light imaging sensor 1810 can hypothetically span the width of the shortwave ultraviolet light sensor and lens assembly 1800, enabling the power lines and insulator bushings to be scanned for SWUV radiation emissions. The UAS may be deployed to fly at a predetermined aerial velocity to enable the solar-blind shortwave ultraviolet light imaging sensor 1810 sufficient time to make a detection. In some embodiments, the solar-blind shortwave ultraviolet light imaging sensor 1810 may supply an output to a driver circuit for processing based at least on the solar-blind shortwave ultraviolet light imaging sensor 1810 receiving at least two radiation pulses within a predetermined duration of time (e.g., about 2 seconds) for the driver circuit to register the non-thermal event as a detection. This is advantageously performed to reduce the number of false alarms due to random triggering of the solar-blind shortwave ultraviolet light imaging sensor 1810 by cosmic rays.

In an embodiment, the ultraviolet light transmissive lens 1820 may be implemented by a motorized zoom lens to adjust a focus to the scene. Once SWUV radiation is detected, the motorized zoom lens can be adjusted to narrow the field of view and enable the shortwave ultraviolet light sensor and lens assembly 1800 to begin scanning for the non-thermal anomaly and localize the detection more precisely on the transmission line or high-voltage switchgear.

In some embodiments, the shortwave ultraviolet light sensor and lens assembly 1800 may be implemented with a Faraday cage for electromagnetic isolation under certain conditions. In some examples, the ferromagnetic resistance of the solar-blind shortwave ultraviolet light imaging sensor 1810 is considered in the projected flight path of the UAS when determining the minimum distance from the power lines the UAS can be operated without having the solar-blind shortwave ultraviolet light imaging sensor 1810 become damaged during the flight path. The Faraday cage around the shortwave ultraviolet light sensor and lens assembly 1800 can help mitigate these concerns.

Figure 19:
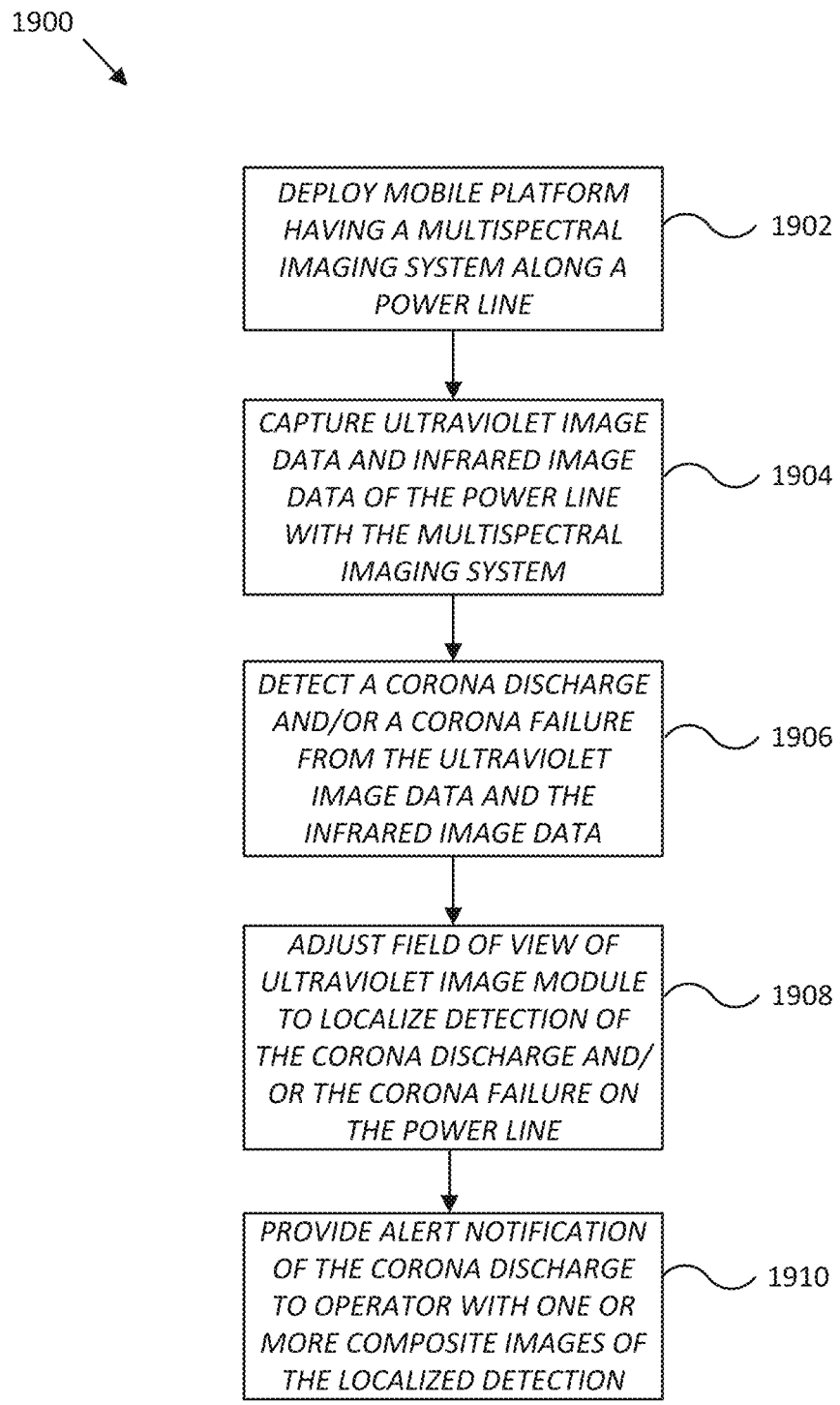
FIG. 19 illustrates a flow diagram of an example process with various operations to monitor electrical equipment using a multispectral imaging system in accordance with embodiments of the subject technology.

FIG. 19 illustrates a flow diagram of an example process with various operations to monitor electrical equipment using a multispectral imaging system in accordance with embodiments of the disclosure. In some embodiments, the operations of FIG. 19 may be implemented as software instructions executed by one or more logic devices or controllers associated with corresponding electronic devices, sensors, and/or structures depicted in FIGS. 1-3. More generally, the operations of FIG. 19 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 1900 may be performed in an order or arrangement different from the embodiments illustrated by FIG. 19. For example, in other embodiments, one or more blocks may be omitted from or added to each individual process. Furthermore, block inputs, block outputs, various sensor signals, sensor information, calibration parameters, and/or other operational parameters may be stored to one or more memories prior to moving to a following portion of a corresponding process. Although process 1900 is described with reference to systems described in FIGS. 1-3, process 1900 may be performed by other systems different from those systems and including a different selection of electronic devices, sensors, assemblies, mechanisms, platforms, and/or platform attributes.

Process 1900 of FIG. 19 may generally correspond to a method for monitoring electrical equipment using the multispectral imaging system 100. The process 1900 begins at step 1902, where a mobile platform having the multispectral imaging system 100 is deployed along a power line. In various embodiments, the mobile platform may be implemented by modern manned and unmanned mobile platforms, including unmanned sensor platforms, such as unmanned aerial vehicles (UAVs), remotely operated underwater vehicles (ROVs), unmanned (water) surface vehicles (USVs), and unmanned ground vehicles (UGVs), can operate over long distances and in all environments. In some examples, the multispectral imaging system 100 may be guided (e.g., flown) by the mobile platform to or along a portion of an electrical system such as along the power line such as a high voltage transmission line.

Next, at step 1904, ultraviolet image data and infrared image data of the power line is captured with the multispectral imaging system 100. For example, the multispectral imaging system 100 may be implemented by a LWIR detector to capture the infrared image data and a SWUV detector to capture the ultraviolet image data.

Subsequently, at step 1906, a corona discharge and/or a corona failure is detected with the multispectral imaging system 100. For example, a failure and/or potential failure of some or all of the electrical equipment (e.g., a portion of the power line) may be detected using the ultraviolet image data and the infrared image data.

Next, at step 1908, a field of view of the ultraviolet image module implemented by the SWUV detector is adjusted to localize detection of the corona discharge and/or the corona failure on the power line. For example, the SWUV detector may be implemented with a motorized zoom lens that is adapted to adjust a focus to the scene (e.g., the portion of the power line with the corona discharge). Once the corona discharge is detected, the motorized zoom lens can be adjusted to narrow the field of view and enable the ultraviolet image module to begin scanning for the corona discharge and localize the detection more precisely on the portion of the power line.

Subsequently, at step 1910, an alert notification of the corona discharge can be provided to an operator with one or more composite images of the localized detection. For example, the multispectral imaging system 100 can generate the alert notification in response to occurrence of at least two preset conditions associated with the LWIR detector and the SWUV detector to reduce and/or minimize the false alarm rates. In an embodiment, the alert notification may be provided for display with composite image data. The alert notification may be rendered within an overlay superimposed over the thermal infrared imagery of the composite image data that corresponds to the field of view of the SWUV detector. The alert notification can include graphical elements in a predetermined color to illustrate the relative strength of the corona discharge. In an embodiment, the density of the graphical elements can increase as the intensity of the corona discharge increases. In this respect, the alert notification can facilitate the assessment of the UV anomaly by the operator.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

The invention claimed is:

1. A system comprising:
a multispectral imaging system, wherein the multispectral imaging system comprises an infrared imaging module configured to provide infrared image data associated with a first spectral band and an ultraviolet imaging module configured to provide ultraviolet image data associated with a second spectral band, of at least a portion of a scene; and
a logic device configured to communicate with the multispectral imaging system, wherein the logic device is configured to:
determine a ratio of a first radiant intensity in the first spectral band to a second radiant intensity in the second spectral band, from the infrared image data and the ultraviolet image data;
determine whether the ratio corresponds to a predetermined radiant intensity ratio of a thermal or electrical anomaly; and
detect at least one of the thermal or electrical anomaly associated with the scene when the ratio corresponds to the predetermined radiant intensity ratio of the thermal or electrical anomaly.

2. The system of claim 1, wherein the logic device is further configured to generate an alert notification in response to an occurrence of a first condition associated with the infrared imaging module and a second condition associated with the ultraviolet imaging module;
wherein the first condition comprises detection of a source associated with the first spectral band in a field of view of the infrared imaging module that has a temperature associated with an intensity value of a pixel of the infrared image data that exceeds a preset threshold value; and
wherein the second condition comprises detection of a source associated with the second spectral band in a field of view of the ultraviolet imaging module that has shortwave ultraviolet radiation associated with an intensity value of a pixel of the ultraviolet image data that exceeds a preset radiant intensity threshold value.

3. The system of claim 1, wherein the logic device is further configured to:
detect a first object corresponding to a hot spot associated with the infrared image data;
detect a second object corresponding to a bright spot associated with the ultraviolet image data;
combine the ultraviolet image data and the infrared image data to generate composite image data;
determine whether the first object is spatially corresponding to the second object in the composite image data; and
compare the ratio to a plurality of predetermined radiant intensity ratios when the first object is spatially corresponding to the second object.

4. The system of claim 1, wherein the ultraviolet imaging module comprises:
a solar-blind shortwave ultraviolet light imaging sensor; and
an ultraviolet light transmissive lens arranged laterally along an optical axis from the solar-blind shortwave ultraviolet light imaging sensor by a predetermined focal length distance.

5. The system of claim 4, wherein the solar-blind shortwave ultraviolet light imaging sensor comprises:
a gas-filled tube;
an anode; and
a photocathode, wherein the photocathode is arranged at near physical proximity from the anode within the gas-filled tube.

6. The system of claim 4, further comprising:
an ultraviolet bandpass filter interposed between the ultraviolet light transmissive lens and the solar-blind shortwave ultraviolet light imaging sensor, wherein the ultraviolet bandpass filter is configured to block light having wavelengths longer than about 260 nanometers and to pass light having wavelengths shorter than about 260 nanometers.

7. The system of claim 4, further comprising:
a pulsed shortwave ultraviolet light source configured to radiate a pulse of radiation onto the ultraviolet light transmissive lens, wherein at least a portion of the pulse of radiation is reflected from a surface of the ultraviolet light transmissive lens to the solar-blind shortwave ultraviolet light imaging sensor for detecting an oily film contamination on the surface of the ultraviolet light transmissive lens; and
a light shield interposed between the pulsed shortwave ultraviolet light source and the solar-blind shortwave ultraviolet light imaging sensor for isolating the solar-blind shortwave ultraviolet light imaging sensor from the pulse of radiation.

8. The system of claim 1, wherein the ultraviolet imaging module has a boresight that substantially corresponds to an optical axis of the infrared imaging module and/or wherein the ultraviolet imaging module comprises one or more optical elements having a field-of-view (FOV) that corresponds to that of the infrared imaging module.

9. The system of claim 1, wherein the ultraviolet imaging module further comprises:
an environmental housing with a shortwave ultraviolet transmissive window; and
a motorized steering mirror arranged within the environmental housing, wherein the motorized steering mirror is configured to rotate continuously at a predetermined rate for scanning the at least the portion of the scene through the shortwave ultraviolet transmissive window for shortwave ultraviolet sources or rotate in response to detection of a shortwave ultraviolet source within the at least the portion of the scene.

10. The system of claim 1, further comprising:
a fiber-couple shortwave infrared spectrometer configured to sample a spectrum of a thermal anomaly in a plurality of equidistant spaced spectral channels,
wherein the logic device is further configured to:
perform a comparison of the spectrum of the thermal anomaly to a library of known thermal anomaly spectra using one or more trained neural networks,
identify a composition of the thermal anomaly from the comparison; and
cause deployment of a type of retardant agent through an action of a mobile platform based at least on the composition of the thermal anomaly, wherein the mobile platform is a ground-based robotic vehicle or an unmanned aerial vehicle.

11. The system of claim 1, further comprising:
a memory configured to store the ultraviolet image data and the infrared image data,
wherein the logic device is in communication with the memory and are configured to receive the ultraviolet image data and the infrared image data from the memory, and wherein the logic device is further configured to:
extract identifying information of the at least the portion of the scene from at least one of the ultraviolet image data or the infrared image data, and
generate an overlay comprising the identifying information and visual enhancements that augment the at least one of the thermal or electrical anomaly within the at least the portion of the scene, and further comprising a display, wherein the display is in communication with the logic device and configured to display the overlay over at least one of the ultraviolet image data or the infrared image data or composite image data.

12. The system of claim 1, further comprising an unmanned vehicle coupled to the ultraviolet imaging module, the infrared imaging module and the logic device and configured to transport the imaging modules and the logic device to various portions of the scene.

13. A monitoring system, comprising:
a mobile platform; and
a camera coupled to the mobile platform and comprising:
a first imaging module comprising an infrared light imaging sensor configured to capture infrared image data associated with a first spectral band, of at least a portion of a scene;
a second imaging module comprising an ultraviolet light imaging sensor configured to capture ultraviolet image data associated with a second spectral band, of at least a corresponding portion of the scene;
a memory configured to store the ultraviolet image data and the infrared image data; and
a logic device in communication with the memory and configured to:
receive the ultraviolet image data and the infrared image data from the memory;
combine the ultraviolet image data and the infrared image data to generate composite image data;
determine a ratio of a first radiant intensity in the first spectral band to a second radiant intensity in the second spectral band, from the composite image data;
determine whether the ratio corresponds to a predetermined radiant intensity ratio of a thermal or electrical anomaly; and
detect at least one of the thermal or electrical anomaly associated with the scene when the ratio corresponds to the predetermined radiant intensity ratio of the thermal or electrical anomaly,
wherein the mobile platform is configured to carry the camera between various portions of the scene.

14. The monitoring system of claim 13, wherein the logic device is further configured to generate an alert notification in response to an occurrence of a first condition associated with the infrared light imaging sensor and a second condition associated with the ultraviolet light imaging sensor, wherein the first condition comprises detection of a first source associated with the first spectral band in a field of view of the infrared light imaging sensor that has a temperature associated with an intensity value of a pixel of the composite image data that exceeds a preset threshold value, and wherein the second condition comprises detection of a second source associated with the second spectral band in a field of view of the ultraviolet light imaging sensor that has shortwave ultraviolet radiation associated with the intensity value of the pixel of the composite image data that exceeds a preset radiant intensity threshold value.

15. A method, comprising:
receiving, by a logic device, multispectral image data from a multispectral imaging system;

determining, by the logic device, a spectrum-differentiated radiant intensity ratio based, at least in part, on the multispectral image data; and identifying, by the logic device, at least a portion of an imaged scene corresponding to one or more of a thermal or electrical anomaly present within the image scene based, at least in part, on the spectrum-differentiated radiant intensity ratio.

16. The method of claim 15, wherein receiving the multispectral image data from a multispectral imaging system comprises:

receiving, by the logic device, infrared image data associated with a first spectral band, of at least a portion of a scene, from an infrared light imaging sensor in the multispectral imaging system; and receiving, by the logic device, ultraviolet image data associated with a second spectral band, of at least a corresponding portion of the scene from an ultraviolet light imaging sensor in the multispectral imaging system.

17. The method of claim 16, further comprising:

combining, by the logic device, the ultraviolet image data and the infrared image data to generate composite image data.

18. The method of claim 17, wherein the determining the spectrum-differentiated radiant intensity ratio comprises determining, by the logic device, a ratio of a first radiant intensity in the first spectral band to a second radiant intensity in the second spectral band, from the composite image data.

19. The method of claim 18, wherein the identifying the at least the portion of the imaged scene corresponding to the one or more of the thermal or electrical anomaly present within the image scene comprises:

determining, by the logic device, whether the ratio corresponds to a predetermined radiant intensity ratio of the thermal or electrical anomaly; and detecting, by the logic device, at least one of the thermal or electrical anomaly associated with the scene when the ratio corresponds to the predetermined radiant intensity ratio of the thermal or electrical anomaly.

20. The method of claim 19, further comprising:

generating, by the logic device, an alert notification in response to the detecting of the at least one of the thermal or electrical anomaly.

* * * * *